United States Patent
Yamasaki

(10) Patent No.: US 8,428,556 B2
(45) Date of Patent: Apr. 23, 2013

(54) COMMUNICATION MANAGEMENT SYSTEM, COMMUNICATION MANAGEMENT TERMINAL DEVICE, COMMUNICATION MANAGEMENT METHOD AND COMMUNICATION MANAGEMENT PROGRAM

(75) Inventor: Kentaro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 12/668,573

(22) PCT Filed: Jul. 10, 2008

(86) PCT No.: PCT/JP2008/062510
§ 371 (c)(1),
(2), (4) Date: Jan. 11, 2010

(87) PCT Pub. No.: WO2009/008482
PCT Pub. Date: Jan. 15, 2009

(65) Prior Publication Data
US 2010/0197275 A1 Aug. 5, 2010

(30) Foreign Application Priority Data
Jul. 10, 2007 (JP) .................................. 2007-181425

(51) Int. Cl.
*H04M 3/16* (2006.01)
(52) U.S. Cl.
USPC ............... 455/411; 706/20; 706/47; 709/204; 709/206; 709/229

(58) Field of Classification Search .................. 455/411; 706/20, 47; 709/204, 206, 229
See application file for complete search history.

(56) References Cited

FOREIGN PATENT DOCUMENTS

| | | | |
|---|---|---|---|
| JP | 2000-196771 | A | 7/2000 |
| JP | 2001-086307 | A | 3/2001 |
| JP | 2003-284157 | A | 10/2003 |
| JP | 2003-289375 | A | 10/2003 |
| JP | 2004-523012 | A | 7/2004 |
| JP | 2005-275988 | A | 10/2005 |
| JP | 2007-143187 | A | 6/2007 |

OTHER PUBLICATIONS

International Search Report for PCT/JP2008/062510 mailed Aug. 19, 2008.

*Primary Examiner* — Amancio Gonzalez

(57) ABSTRACT

Communication from inadmissible communication parties and communication accesses are excluded from an unspecified number of communication parties and communication accesses. A communication management system is provided with a communication device for communicating with communication parties connected through a communication network, a communication control device for controlling the communication, a communication history information memory device for storing communication history information indicative of communication history of the communication device, and a communication admissible party selecting device for selecting communication admissible parties who are admitted to communication with the communication device in accordance with the communication history information, wherein the communication control device has a communication admission control function to carry out admission control of communication from the selected communication parties.

16 Claims, 13 Drawing Sheets

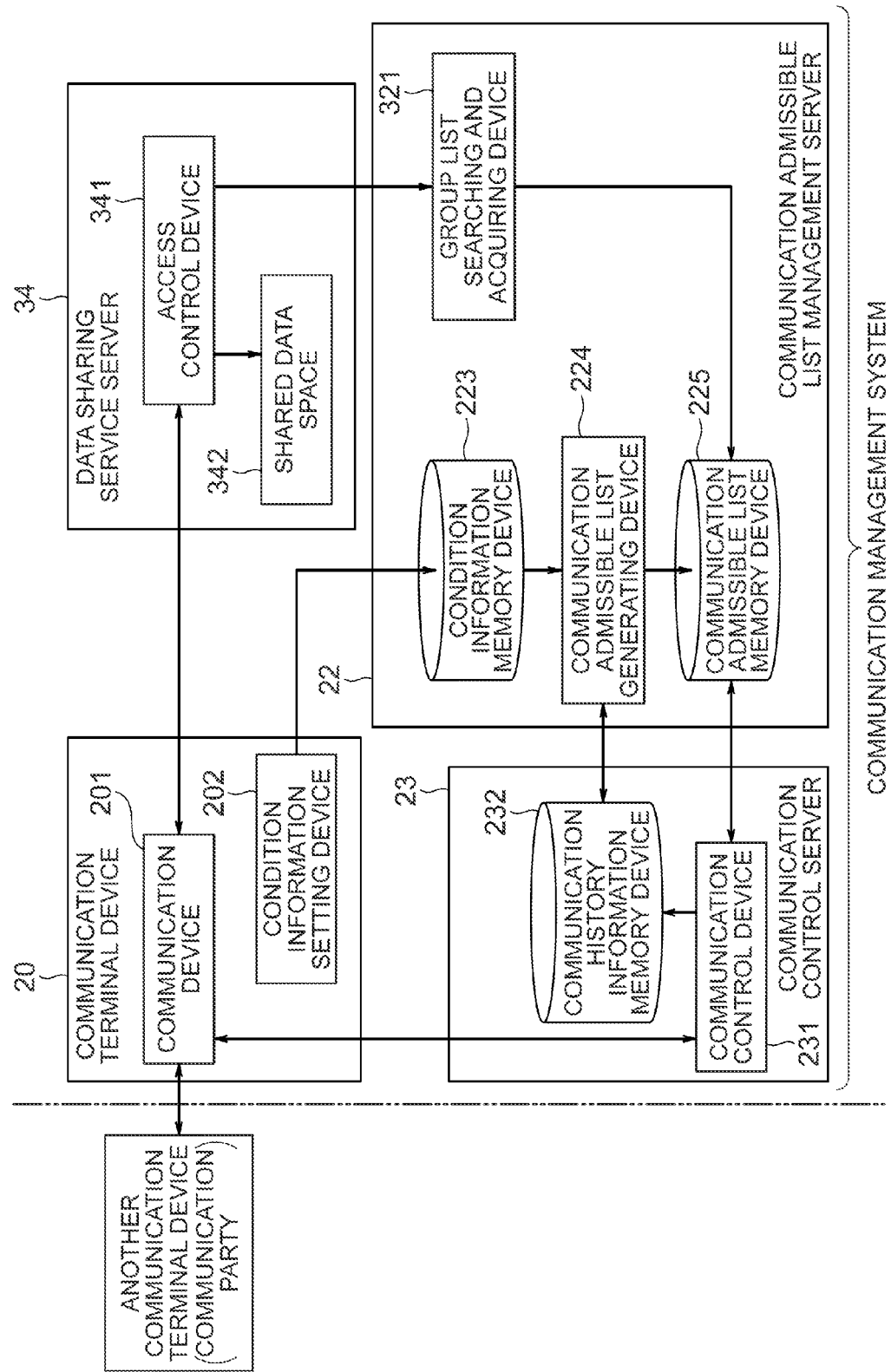

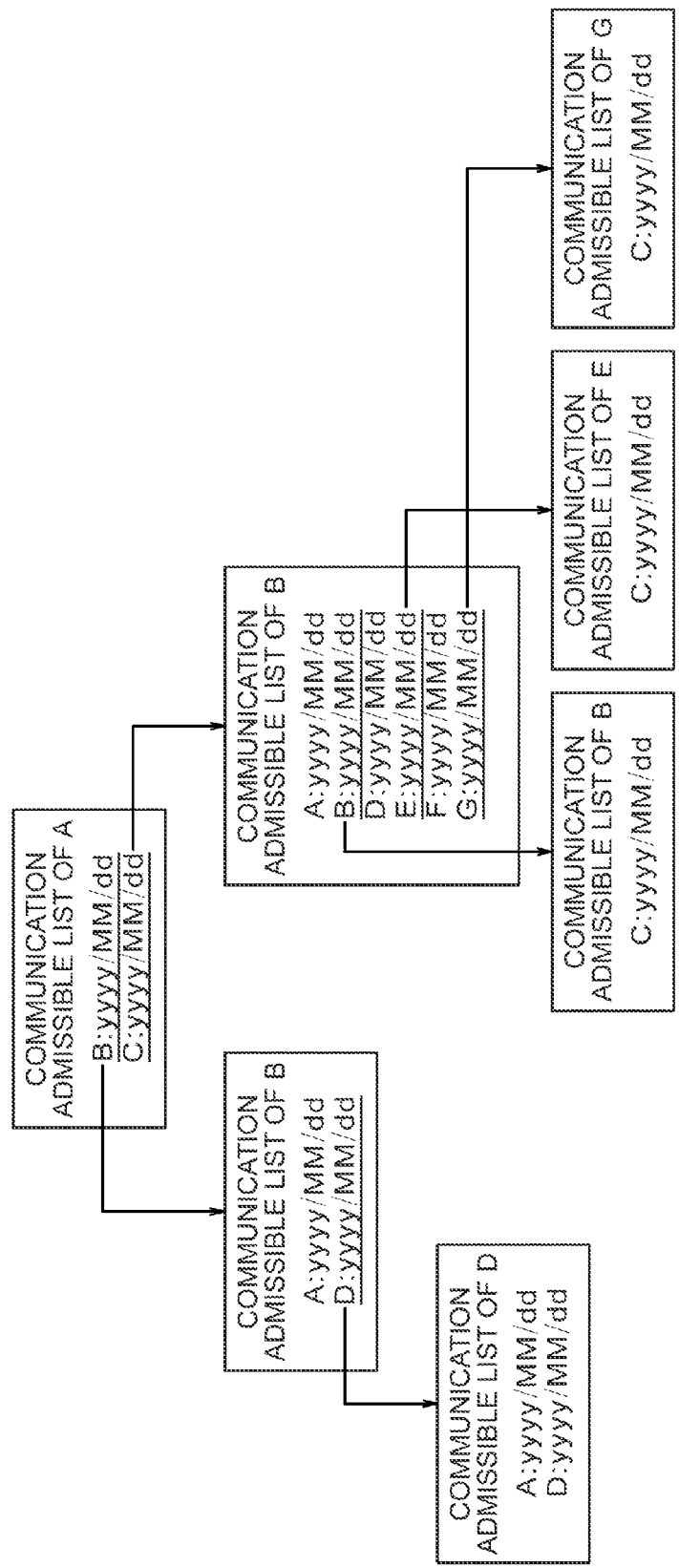

COMMUNICATION MANAGEMENT SYSTEM, COMMUNICATION MANAGEMENT TERMINAL DEVICE, COMMUNICATION MANAGEMENT METHOD AND COMMUNICATION MANAGEMENT PROGRAM

This Application is the National Phase of PCT/JP2008/062510 filed on Jul. 10, 2008, which claims the Priority right based on Japanese Patent Application No. 2007-181425 filed on Jul. 10, 2007, and the disclosure thereof is hereby incorporated by reference in its entirety.

TECHNICAL FIELD

The present invention relates to a communication management system, a communication management terminal device, a communication management method, and a program thereof, which are capable of having communications with highly reliable communication parties by eliminating unwanted communications transmitted from communication parties via a communication network.

BACKGROUND ART

With a communication network utilized by unspecified large number of people, there may be generated communications that are not desired by the users of the communication network, such as crank calls, unsolicited e-mails, and ill-willed communication accesses. As measures taken for such cases, services utilized heretofore are: a service which rejects reception of calls and e-mails by ordering a telecommunication company to reject e-mails and incoming calls from a specific terminal device and a specific communication party; an unsolicited e-mail countermeasure service capable of rejecting reception of a specific e-mail and the like, which is provided by an Internet access provider.

However, for the above-described services, it is necessary to apply in advance to the telecommunication company or to the Internet access provider regarding the communication party from whom the user desires to reject the e-mails and calls. Thus, a heavy burden is imposed on the user, e.g., it is necessary for the user to specify such communication party. Further, it has been difficult to implement a flexible communication management service upon which the intention of the user is reflected.

In the meantime, it is possible to lighten the risk of the user to be involved in the aforementioned unwanted communications through employing a method with which: the user of a communication network allows only the communication accesses and communications from specific communication parties, and further, the specific communication parties are put into a list; and communications are performed only with the communication parties on the list. The list of the communication parties permitted to make communications in this case is called a white list hereinafter as opposed to a black list.

However, such white list needs to be managed individually by the users of the communication network. This imposes such a troublesome work on the users that the communication party permitted to have communications need to be added or deleted explicitly by the user.

For such inconvenience, no method for controlling communications by generating and managing such white list automatically has been disclosed.

Patent Document 1: Japanese Patent Application Publication 2004-523012

Patent Document 2: Japanese Unexamined Patent Publication 2005-275988

As described above, a first issue is that the white list needs to be managed by individual users, and the other users and communication parties the user desires to permit to have communications have to be added and deleted manually. Thus, such troublesome work has to be done by the users themselves.

Further, a second issue is that it is necessary to conduct constant maintenance in order to keep the usefulness and the reliability of the white list, since the user added once to the white list continues to be on the white list unless it is canceled from the white list manually. In this regards, it is a troublesome work for the user.

It is therefore an object of the present invention to improve the above-described inconveniences and to eliminate communications and communication accesses from communication parties that are not permitted to have communications with a communication device, when communications and communication accesses are made from the communication parties to the communication device which is connected to unspecified large number of people via a communication network.

In order to achieve the foregoing object, the communication management system according to the present invention is designed as a communication management system which manages talks and communications performed via a communication network, and the system includes: a communication history information memory device which stores history information of the talks and communications by each talk and communication partner user; a condition information memory device which stores a reliability rule that is a basis for judging a reliability relationship of the talks and communications; a communication admissible list generating device which judges whether or not the partner user is reliable enough based on the history information of the talks and communications stored in the communication history information memory device and the reliability rule stored in the condition information memory device, and generates a list with a valid time limit; and a communication admissible list memory device which stores the list generated by the communication admissible list generating device, and provides the list in response to an inquiry that is made when performing the talk and communication with the partner user.

The communication management program according to the present invention is a communication management program which controls management of talks and communications performed via a communication network, and the program causes a computer to execute: a function which manages history information of the talks and communications as a database by each partner user of the talks and communications; a function which manages a reliability rule as a basis for judging a reliability relationship of the talks and communications as a database; a function which judges whether or not the partner user is reliable enough based on the history information of the talks and communications and the reliability rule, and generates a list with a valid time limit; and a function which manages the list, and provides the list in response to an inquiry that is made when performing the talk and communication with the partner user.

The communication management method according to the present invention is a communication management method which controls management of talks and communications performed via a communication network, and the method includes: managing history information of the talks and communications as a database by each partner user of the talks and communications; managing a reliability rule as a basis for judging a reliability relationship of the talks and communications as a database; judging whether or not the partner user is reliable enough based on the history information of the talks and communications and the reliability rule, and generating a list with a valid time limit; and managing the list, and providing the list in response to an inquiry that is made when performing the talk and communication with the partner user.

The present invention includes the communication admissible party selecting device for selecting the communication party that is permitted to have communications with the communication device based on the history information of the communications made by the communication device. This makes it possible to eliminate the communications and the communication accesses from the communication party who is not permitted to have communications and to update the communication party selected based on the updated history information.

BEST MODES FOR CARRYING OUT THE INVENTION

Next, an exemplary embodiment of a communication management system according to the invention will be described by referring to the accompanying drawings.

First Exemplary Embodiment

A first exemplary embodiment according to the communication management system of the present invention is designed to be applied to a communication terminal device 10 that is connected to a communication network shown in FIG. 1 to manage telephone calls and communications made by the communication terminal device 10. As shown in FIG. 1, the communication terminal device 10 includes a communication device 11 which performs communications with communication parties that are connected to the communication network.

As the basic structure, the communication management system according to the first exemplary embodiment of the invention includes: communication history information 12 for storing communication history information regarding the communications made by the communication device 11; and a communication admissible list generating device 14 which makes a list of communication parties that are permitted to have communications with the communication device 11 based on the communication history information. As will be described later, a period (and a time limit) during which the communications are permitted is set for each of the communication parties that are on the list.

Further, the management communication system also includes: a condition information memory device 13 which stores condition information that is applied when the communication admissible list generating device 14 makes the list of the communication parties; and a communication admissible list memory device 15 which stores the list generated by the communication admissible list generating device 14. Note here that the communication terminal device 10 performs communications with the communication terminals that are on the list, based on the list stored in the communication admissible list memory device 15.

The communication terminal device 10 may be a typical server device or a computer having a CPU, a memory, a hard disk device, and the like or a portable terminal such as a portable telephone or a PDA having a CPU, a memory and the like.

Details thereof will be described hereinafter.

The communication device 11 has a communication interface connected to the communication network, and has a communication control function (corresponds to a communication control device) which controls communications performed with other users (communication parties) by using a telephone, e-mail, and the like. Thereby, the communication terminal device 10 can make communications with the communication parties by voice, data, or multimedia.

Further, the communication device 11 has a receiving-communication judging function which judges whether or not to permit the communications by referring to the communication admissible list (corresponds to the communication admissible period list) in the communication admissible list memory device 15 for the telephone calls, communications, and the communication accesses (collectively referred to as "communication") performed with the communication parties.

Furthermore, the communication device 11 has a history information storing function which generates communication history information showing the history of communications made by the communication device 11 and stores the communication history information to the communication history memory device 12. The communication history information may contain the information for specifying the communication party, the number of times of communications, and communication amount.

Further, the communication device 11 has a list search and judging function which searches the communication admissible list memory device 15 before having the communication and judges whether or not the communication party with which the communication device 11 is to have a communication is on the communication admissible list and whether or not the period within which the communication is permitted (referred to as "valid period" hereinafter) is unexpired. The communication device 11 does not have a communication with the communication party whose valid time limit is expired.

The communication history information memory device 12 is a database having a history information storing function which stores the communication history information of the communication device 11. As described above, the communication history information contains information regarding the communication party users with whom the communication terminal device 10 performs communications via the communication device 11, the communication start time, communication end time, length of communicated time, communication data amount, and the like. In accordance with the communication made by the communication device 11, the content of the communication history information is updated. Thus, it is possible to keep the state having the latest communication history information stored in the communication history information memory device 12.

Further, the communication history information memory device 12 may be set not to record the history information when the communication party user does not respond to transmission and reception of communications or the communication terminal 10 side does not respond to the communication made from the communication party.

This makes it possible not to allot the communication admissible period for a case of one-sided communication (or communication request) and a case where a communication session is not established. Further, it is possible to avoid giving a communication admissible period allotted (issued) anew to the communication party that is on the communication admissible list, based on the one-sided communication (or communication request).

As described above, in a case of one-sided communication (or communication request) and a case where a communication session is not established, the communication history information memory device 12 may be set to record information indicating that the communication session is not established.

In this case, it is also possible to avoid giving a communication admissible period allotted to the case of one-sided communication (or communication request) and the case where a communication session is not established. Furthermore, it is also possible to manage the communication parties who make one-sided communications (or communication requests) by putting them on a list.

The condition information memory device 13 has a condition information holding function which holds condition information (referred to as "reliability rule" hereinafter) that is set in advance as the basis for judging the relationship of trust with each of the communication parties.

The reliability rule is the information used for judging whether or not the communication party user can be trusted, and it contains the communication history information period (referred to as "target period" hereinafter) as a target used for calculation processing when calculating the communication admissible period (or communication admissible time limit) from the communication history information, and the reference values of the number of times of talks or communications that can be judged as being trusted, the time, the amount, and the like thereof.

Note here that the target period as the basis for judging whether or not to trust the communication party is defined as BaseTime, the information for judging whether or not to trust the target period based on the number of times of talks is defined as ConfTalkTime, the information for judging whether or not to trust based on the number of times of talks is defined as ConfTalkCount, the information for judging whether or not to trust based on the number of times of communications is defined as ConfTransCount, and the time which determines the length of given valid time limit is defined as ExtensionTime.

Regarding the relational information thereof, it is assumed that such setting is inputted in advance via an input device that "a valid time limit of ExtensionTime is given to a partner whose length of time of talks is ConfTalkTime, number of times of talks is ConfTalkCount, and the number of times of communications is ConfTransCount in a period of BaseTime". Further, it is also possible to employ a structure in which the reliability rule can be inputted and set by the user using an input device that is provided normally to the communication terminal device 10, such as a keyboard.

The communication admissible list generating device 14 has a history information acquiring function which acquires the communication history information made by the communication party in a target period (LogLength) of a specific past period set in advance from the communication history information memory device 12.

As the communication history information, acquired are the total time length of talks and communications TalkTimeTox, the number of times of talks TalkCountTox, and the number of times of communications TransCountTox. Processing target period LogLength may be set by the user of the communication terminal device 10 by using an input device such as a keyboard. Alternatively, the communication terminal device 10 may have default fixed setting. However, the method for setting the processing target period LogLength is not limited to those.

Further, the communication admissible list generating device 14 has a reliability rule information acquiring function which acquires the reliability rule from the relation judging information holding device 13, and a communication admissible period calculating function which calculates period (communication admissible period) during which the communication with each communication party is permitted and the communication admissible time limit (valid time limit) which is the time limit of the period based on the acquired reliability rule and the communication history information.

The communication admissible period is obtained by using a following expression.

$$CurrentTime + \qquad \text{[Expression 1]}$$
$$\alpha_1 \left( \frac{TalkTimeTox \times BaseTime}{ConfTalkTime \times LogLength} \times ExtensionTime \right) +$$
$$\alpha_2 \left( \frac{TalkTimeTox \times BaseTime}{ConfTalkTime \times LogLength} \times ExtensionTime \right) +$$
$$\alpha_3 \left( \frac{TalkTimeTox \times BaseTime}{ConfTalkTime \times LogLength} \times ExtensionTime \right)$$

Note here that CurrentTime is the current time, and $\alpha_1$-$\alpha_3$ are weight variables of the reliability rule with which "$\alpha_1 + \alpha_2 + \alpha_2 = 1$" can be satisfied.

The weight variables of each reliability rule may be set by the user of the communication terminal device 10 via the input device such as a keyboard. Alternatively, the communication terminal device 10 may have default setting in advance. Further, the method of setting such variables is not limited only to those.

Furthermore, for the expression for calculating the valid time limit is not limited to the above-described one, but any expression can be used as long as it is an expression with which the valid time limit changes depending on the quantitative values such as the communicated time, the number of times of communications, and the communication amount acquired from the communication history information.

Moreover, it is possible to set so as not to issue the valid time limit for the case where the quantitative values such as the communicated time, the number of times of communications, and the communication amount acquired from the communication history information do not reach the defined values.

Further, the communication admissible list generating device 14 has a valid time limit updating function which compares the newly calculated valid time limit with the corresponding entry valid time limit registered in advance to the communication admissible list, and updates the entry valid time limit to the newly calculated valid time limit when the newly calculated valid time limit is later than the entry valid time limit.

When the newly calculated valid time limit is within the registered communication admissible period, i.e., when the newly calculated valid time limit expires before the valid time limit, the valid time limit is not updated.

Further, the communication admissible list generating device 14 has an admissible time limit confirming function which confirms whether or not the communication admissible time limit of each partner terminal device on the list is valid, and also has a terminal registration canceling function which deletes the communication party from the list when the valid time limit is expired, i.e., when the current time has passed the communication admissible time limit.

Furthermore, the communication admissible list generating device 14 has a list storing function which stores the generated communication admissible list to the communication admissible list memory device 15.

The generated communication admissible list is table information which is configured with entry information having the communication party user (communication party) and the communication admissible period (valid time limit) corresponding to the communication party as one unit.

The communication admissible list memory device 15 has a communication admissible list storing and holding function which stores and holds the generated communication admissible list, and a list information providing function which provides the entry information of the corresponding communication admissible list in response to a request from the communication device 11.

(Explanation of Actions of First Exemplary Embodiment)

Next, actions of the communication management system according to the first exemplary embodiment will be described.

First, when the communication device 11 performs a communication with a communication party that is permitted to have communications in advance, the communication history is outputted to the communication history information memory device 12, and the communication history information memory device 12 updates the communication history information (a history information updating step). Then, the communication admissible list generating device 14 acquires the updated communication history information from the communication history information memory device 12 (a history information acquiring step). Thereafter, the communication admissible list generating device 14 acquires the admissible period setting condition from the condition information memory device 13 (a setting condition acquiring step), and sets the communication admissible period based on the admissible period setting condition and the communication history information (a communication admissible period setting step). The communication device 11 selects the communication party that is permitted to have communications with the communication device based on the communication history information (a communication admissible party selecting step).

The contents of the history information updating step, the history information acquiring step, the setting condition acquiring step, the communication admissible period setting step, and the communication admissible party selecting step may be put into a program and have it executed by a computer. In that case, the program is recorded on a recording medium, and the recording medium having the program recorded thereon can be handled as a target of commercial transactions.

Now, the action of the communication terminal device 10 executed when generating the communication admissible list based on the communication and talk history information (registration update of the communication admissible list) will be described by referring to a flowchart of FIG. 2.

First, the communication device 11 performs a communication with a communication party, generates the communication history information based on the communication, and stores the communication history information to the communication history information memory device 12 (step S101). Thereby, the communication history information in the communication history information memory device 12 is updated.

Then, the communication admissible list generating device 14 acquires the communication history information of the communication party regarding the communications performed by the communication device 11 in a specific past period (hereinafter, referred to as "processing target period"—LogLength) (step S102). Thereafter, the communication admissible list generating device 14 acquires the reliability rule that is the setting condition of the communication admissible period from the condition information memory device 13 (step S103).

The communication admissible time limit (referred to as "valid time limit" hereinafter) for each of the corresponding communication parties is calculated based on the reliability rule and the communication history information (step S104), and the calculated valid time limit and the valid time limit registered in advance to the communication admissible list memory device 15 are compared (step S105).

When the newly calculated valid time limit is later than the valid time limit of the communication entry registered in advance, the valid time limit of the communication entry is updated to the newly calculated valid time limit (step S106). In the meantime, when the newly calculated valid time limit is before the already-registered valid time limit of the communication admissible list, the valid time limit of the communication entry is not updated.

Then, based on a result obtained by conducting the judgment on all the communication entries on the communication admissible list, the communication party whose valid time limit is expired is deleted from the communication admissible list (step S107).

Thereby, the communication parties that are permitted to have communications are put on the communication admissible list, and the communication party whose time limit of the communication admissible period (valid time limit) is expired can be eliminated automatically.

When making a communication with the communication party, the communication device 11 always refers to the communication admissible list, and establishes a communication session only with the communication party which is on the communication admissible list and has a valid communication admissible period.

Therefore, it is possible to effectively avoid having one-sided communications from the partner side, such as crank calls and unsolicited mails.

Next, described by referring to a flowchart of FIG. 3 is an action of the communication terminal device 10 for judging whether or not to permit a communication with a communication party (communication permission judgment) when performing a communication with the communication party via the communication device 11.

First, the communication device 11 accesses to the communication admissible list memory device 15 and searches the entry regarding the communication party that is about to have a communication (step S111), and judges whether or not the entry of the communication party is contained on the communication admissible list (step S112).

When the entry is not found therein, the communication party is considered as an unreliable communication party. Thus, no communication is performed.

When the entry of the communication party is on the communication admissible list, the valid time limit of the entry is compared with the current time (step S113), and it is judged whether or not the valid time limit is later than the current time, i.e., whether or not the communication admissible period is valid (step S114).

When the communication admissible period is valid, the communication device 11 considers the communication party as reliable, and establishes a communication session with the communication party and starts a communication (step S115: communication call establishment control function).

In the meantime, when the communication admissible period is invalid, i.e., when the valid time limit is expired, the communication device considers the communication party as unreliable, and does not establish a communication session (step S116).

As described above, with the first exemplary embodiment, the communication terminal device can eliminate communications and communication accesses from malicious communication parties, such as crank calls and unsolicited mails. Therefore, it is possible to select the communication party flexibly on the communication terminal device used by the user without applying to a telecommunication company or an Internet access provider. Further, it is possible to generate and update the communication admissible list automatically based on the communication history information, so that the user of the communication terminal device can lighten the troublesome work required for maintaining and keeping the communication admissible list (white list) manually.

Further, through setting the communication admissible period with the communication party having a large amount of talks and communications as well as with other users to be longer, a long period can be allowed to the closely-related communication parties with whom communications are made more frequently. Meanwhile, it comes to automatically reject communications with the communication party which becomes estranged and does not make communications any more.

Further, in order to keep the registered state to the white list, it is necessary to perform a specific amount of talks and communications or more with the party in a specific period. Thus, a malicious user (communication party) registered on the white list can be eliminated effectively.

Second Exemplary Embodiment

Next, a second exemplary embodiment according to the communication management system of the present invention will be described. The second exemplary embodiment of the communication management system of the present invention is a mode in which the communication management system according to the exemplary embodiment of the invention is applied to servers (a communication control server 23, a communication admissible lists management server 22) shown in FIG. 4. The servers manage talks and communications between communication terminals exchanged via a communication network based on the communication management system according to the exemplary embodiment of the invention.

The communication management system according to the second exemplary embodiment of the invention includes: a communication history memory device 232 mounted to the communication control server 23; and a condition information memory device 223, a communication admissible list generating device 224, and a communication admissible list memory device 225 mounted to the communication admissible list management server 22. The communication control server 23 has a communication control device 231 for controlling communications between the communication terminals. Further, a condition information setting device 202 is mounted to the communication terminal device 20.

In FIG. 4, FIG. 6, and FIG. 10, the communication control device 231 and the communication history memory device 232 are mounted to the communication control server 23, while the condition information memory device 223, the communication admissible list generating device 224, and the communication admissible list memory device 255 are mounted to the communication admissible list management server 22 separately. However, the exemplary embodiment is not limited only to such case. The communication control device 231, the communication history memory device 232, the condition information memory device 223, the communication admissible list generating device 224, and the communication admissible list memory device 255 may be mounted to a single server. Further, the communication control device 231, the communication history memory device 232, the condition information memory device 223, the communication admissible list generating device 224, and the communication admissible list memory device 255 may be mounted separately to servers other than the communication control server 23 and the communication admissible list management server 22. In a case where those devices are mounted to a single server, maintenance of each of those devices can be done collectively. Further, by distributing each of those devices in a plurality of blocks by dividing the devices based on the functions, each of the devices can be managed by each function.

The condition information setting device 202 inputs, on the communication terminal device 20 side, setting of the condition information which is applied when selecting the communication party that is allowed to have communications. The communication history information memory device 232 stores the communication history information regarding the communications performed by each communication terminal device. The communication admissible list generating device 224 is connected to the communication history information memory device 232, and generates lists of communication parties of each communication terminal device based on the communication history information. The condition information memory device 223 is provided along with the communication admissible list generating device 224, and stores the condition information inputted from the condition information setting device 202. The communication admissible list memory device 225 stores the lists generated by the communication admissible list generating device 224.

The communication terminal device 20, the communication control server 23, and the communication admissible list management server 22 may be implemented by a typical server device or a personal computer which includes a CPU, a memory, a hard disk device, and the like, or may be a portable terminal such as a portable telephone or a PDA which includes a CPU, a memory, and the like. In that case, the program is recorded on a recording medium, and the recording medium having the program recorded thereon can be handled as a target of commercial transactions.

Detailed explanations thereof will be provided hereinafter.

The communication device 201 of the communication terminal device 20 includes a communication interface connected to the communication network, and executes communications with a communication party (another communication terminal device) via the communication network by using a telephone, e-mail, or the like.

In this exemplary embodiment, the communication device 201 is connected to the communication control device 231 of the communication control server 23 to be described later via a communication line, and executes communications with the communication party according to the communication control performed by the communication control device 231.

The condition information setting device 202 has a condition information setting function which transmits reliability rule setting information to the condition information memory device of the list management server 22.

This makes it possible for the user of the communication terminal device 20 to set the condition for generating the communication admissible list flexibly and easily in accordance with the communication state and the communication party.

The communication admissible list management server 22 may have a function which sets the condition for generating the communication admissible list to the condition information setting device 202.

Next, each device provided to the communication control server 21 will be described in detail.

The communication control device 231 has a communication control function which performs controls of communications and communication sessions executed by the communication device 201 of the communication terminal device 20. Thereby, the communication terminal device 20 can make communications with other users (communication parties) by voice, data, or multimedia via the communication network.

Further, through providing this communication control function to the communication control server 23 that is connected to the communication terminal device 20 via the communication line, communications performed with a plurality of communication terminal devices can be controlled simultaneously. Furthermore, the functional load imposed upon each of the communication terminals devices 20 can be lightened.

Further, the communication control device 231 has a receiving communication judging function which judges whether or not to permit a communication and a communication access (generally called "communication") made to the communication device 201 from a communication party by referring to the communication admissible list in the communication admissible list memory device 225.

Furthermore, the communication control device 231 has a history information storing function which stores the communication history information showing the history of communications performed by the communication device 201 to the communication history information memory device 232. The communication history information may contain the information for specifying the communication party, the number of times of communications, a total amount of communications, and the like.

Further, the communication control device 231 has a list searching and judging function which searches the communication admissible list memory device 225 and judges whether or not the communication party that is to have a communication is on the communication admissible list and whether or not the communication admissible time limit (referred to as "valid time limit" hereinafter) is valid, before performing a communication by the communication device 201. When the valid time limit is expired, the communication control device 231 does not establish a communication session between the communication device 201 and the communication party.

Further, the communication control device 231 has a communication history information storing function which acquires the communication history information of the communication device 201 when the communication device 201 performs a communication, and stores the Communication history information to the communication history information memory device 232. Furthermore, the communication control device 231 has a history information updating function which updates the communication history information stored in the communication history information memory device 232 based on the communication performed by the communication device 201.

In the exemplary embodiment, described is a case where the communication control device 231 takes the communication device 201 of the communication terminal device 20 as a target of communication control. However, it is to be understood that the communication control device 231 also performs the communication control for the communication devices of other different communication terminal devices in the same manner.

Like the communication history information memory device 12 of the first exemplary embodiment, the communication history information memory device 232 is a database having a history information memory function which stores the communication history information of the communication device 201.

Further, as described above, the communication history information contains the information regarding the communication party with which the communication terminal device 20 communicates via the communication device 201, the communication start time, the communication end time, the length of communicated time, the communication data amount, and the like.

In this exemplary embodiment, the communication history information memory device 232 stores and keeps communication history information of a plurality of different communication terminal devices including the communication terminal device 20.

The communication control device 231 updates the contents of the communication history information as the communication device 201 performs a communication, so that the communication history information memory device 232 can maintain the state where the latest communication history information of the communication device 201 is stored.

Further, when the communication party user does not respond to transmit and receive a communication, information including the fact indicating that the communication party does not respond to have a communication is recorded. Alternatively, such case may be set to record no history information.

As in the case of the condition information memory device 13 of the first exemplary embodiment, the condition information memory device 223 provided to the communication admissible list management server 22 has a condition information holding function which holds condition information (referred to as "reliability rule" hereinafter) which is set in advance as the basis for judging the relationship of trust with each of the communication parties.

Further, the condition information memory device 223 has a condition information acquiring function which stores the reliability rule transmitted from the condition information setting device 202.

The reliability rule is the information used for judging whether or not the communication party user can be trusted, and it contains the communication history information period (referred to as "target period" hereinafter) as a target used for calculation processing when calculating the communication admissible period (or communication admissible time limit) from the communication history information, and the reference values of the number of times of talks or communications which can be judged as being trusted, the time, amount, and the like thereof during the target period.

Note here that the target period as the basis for judging whether or not to trust the communication party is defined as BaseTime, the information for judging whether or not to trust the target period based on the length of talks is defined as ConfTalkTime, the information for judging whether or not to trust based on the number of times of talks is defined as ConfTalkCount, the information for judging whether or not to trust based on the number of times of communications is defined as ConfTransCount, and the time which determines the length of given valid time limit is defined as ExtensionTime.

Regarding the relational information thereof, it is assumed that such setting is inputted in advance via the input device that "a valid time limit of ExtensionTime is given to a partner whose length of time of communication is ConfTalkTime, number of times of talks is ConfTalkCount, and the number of times of communications is ConfTransCount in a period of BaseTime".

Further, it is also possible to employ a structure in which the reliability rule can be inputted and set by the user using an input device that is provided normally to the communication terminal device 10, such as a keyboard.

The communication admissible list generating device 224 has a communication history information acquiring function which acquires communication history information from the communication history information memory device 232.

Further, the communication admissible list generating device 224 has a transmission and reception combination list generating function which sets a combination of the caller and receiver (transmitter and receiver) contained in the communication history information as a transmitter and receiver combination entry, and generates a list of transmitter and receiver combinations configured with the transmitter and receiver combination entries.

Note here that the communication admissible list generating device 224 has a history information acquiring function which acquires the communication history made by the communication party in a target period (LogLength) of a specific past period set in advance from the communication history memory device 232 for each of the set transmitter and receiver combination entries in the same manner as that of the communication admissible list generating device 14 of the first exemplary embodiment.

Further, as the communication history information, acquired are the total time length of talks and communication TalkTimeXandY, the number of times of talks TalkCountXandY, and the number of times of communications TransCountXandY. Processing target period LogLength may be set by the user of the communication terminal device by using an input device such as a keyboard. Alternatively, the terminal device may have default fixed setting. However, the method for setting the processing target period LogLength is not limited to those.

Further, the communication admissible list generating device 224 has a reliability rule information acquiring function which acquires the reliability rule from the relation judging information holding device 223, and a communication admissible period calculating function which calculates period (communication admissible period) during which the communication with each communication party is permitted and the communication admissible time limit (valid time limit) based on the acquired reliability rule and the communication history information.

The communication admissible period is obtained by using a following expression.

[Expression 2]
$$CurrentTime + \\ \alpha_1\left(\frac{TalkTimeXandY \times BaseTime}{ConfTalkTime \times LogLength} \times ExtensionTime\right) + \\ \alpha_2\left(\frac{TalkCountXandY \times BaseTime}{ConfTalkTime \times LogLength} \times ExtensionTime\right) + \\ \alpha_3\left(\frac{TransCountXandY \times BaseTime}{ConfTalkTime \times LogLength} \times ExtensionTime\right)$$

Note here that CurrentTime is the current time, and $\alpha_1$-$\alpha_3$ are weight variables of the reliability rule with which "$\alpha_1+\alpha_2+\alpha_3=1$" can be satisfied.

The weight variables of each reliability rule may be set the user of the communication terminal device 20 via the condition information setting device 202. Alternatively, the condition information memory device 223 may have default setting in advance. Further, the method of setting such variables is not limited only to those.

Furthermore, for the expression for calculating the valid time limit is not limited to the above-described one, but any expression can be used as long as it is an expression with which the valid time limit changes depending on the quantitative values such as the communicated time, the number of times of communications, and the communication amount acquired from the communication history information.

Moreover, it is possible to set so as not to issue the valid time limit for the case where the quantitative values such as the communicated time, the number of times of communications, and the communication amount included in the communication history information do not reach the defined values.

Further, the communication admissible list generating device 224 has a valid time limit updating function which compares the newly calculated valid time limit with the corresponding entry valid time limit registered in advance to the communication admissible list, and updates the entry valid time limit to the newly calculated valid time limit when the newly calculated valid time limit is later than the entry valid time limit.

When the newly calculated valid time limit is within the registered communication admissible period, i.e., when the newly calculated valid time limit expires before the valid time limit, the valid time limit is not updated.

Further, the communication admissible list generating device 224 has an admissible time limit checking function which checks whether or not the communication admissible time limit of each partner terminal on the list is valid, and also has a terminal registration canceling function which deletes the communication party from the list when the valid time limit is expired, i.e., when the current time has passed the communication admissible time limit.

Furthermore, the communication admissible list generating device 224 has a list storing function which stores the generated communication admissible list to the communication admissible list memory device 225.

The generated communication admissible list is table information which is configured with entry information having the communication party user (communication party) and the communication admissible period (valid time limit) corresponding to the communication party as one unit.

The communication admissible list memory device 225 has a communication admissible list storing and holding function which stores and holds the communication admissible list generated by the communication admissible list generating device 224, and a list information providing function which provides the corresponding entry information within the communication admissible list in response to a request from the communication device 231.

(Explanation of Actions of Second Exemplary Embodiment)

Next, actions of the communication management system according to the second exemplary embodiment will be described.

First, the communication terminal device 20 makes a communication with a communication party, and the communication control device 231 updates the communication history information stored in the communication history information memory device 232 based on the communication (a history information updating step). Then, the communication admissible list generating device 224 acquires the updated communication history information from the communication history information memory device 232 (a history information acquiring step).

Thereafter, the communication admissible list generating device 224 acquires the admissible period setting condition from the condition information memory device 223 (a setting condition acquiring step), and sets the communication admissible period based on the admissible period setting condition and the communication history information (a communication admissible period setting step). Then, the communication admissible list generating device 224 generates a list of communication parties that are allowed to have communications with the communication device based on the communication admissible period and the communication history information (a communication admissible list generating step).

The contents of the history information updating step, the history information acquiring step, the setting condition acquiring step, the communication admissible period setting step, and the communication admissible list generating step may be put into a program and have it executed by a computer. In that case, the program is recorded on a recording medium, and the recording medium having the program recorded thereon can be handled as a target of commercial transactions.

Now, the action of the communication management system according to the exemplary embodiment executed when generating and updating the communication admissible list based on the communication and talk history information will be described by referring to a flowchart of FIG. 5.

First, the communication device 201 performs a communication with a communication party, and the communication control device 231 generates the communication history information based on the communication and stores the communication history information to the communication history information memory device 232 (step S201). Thereby, the communication history information in the communication history information memory device 232 is updated.

Then, the reliability rule inputted by the condition information setting device 202 of the communication terminal device 20 is transmitted to the condition information memory device 233 of the communication admissible list management server 22 (step S202).

The communication admissible list generating device 224 periodically executes processing for generating and updating the communication admissible list (referred to as "communication admissible list generating and updating processing" hereinafter) based on the communication history information and the reliability rule.

First, the communication admissible list generating device 224 acquires the reliability rule and the communication history information from the history holding device 232 of the communication control server 23 (step S203).

Then, the communication admissible list generating device 224 sets a combination (referred to as a transmitter and receiver combination entry) of the caller and receiver (transmitter and receiver) contained in the acquired communication history information (step S204).

Thereafter, the communication admissible list generating device 224 selects one transmitter and receiver combination, and calculates the valid time limit of the selected transmitter and receiver combination entry (referred to as "selected entry" hereinafter) based on the reliability rule and the communication history information (step S205).

Then, the communication admissible list generating device 224 judges whether or not the selected entry is already registered to the communication admissible list in the communication admissible list memory device 225 (step S206).

When judged that the selected entry is registered in advance to the communication admissible list, the communication admissible list generating device 224 compares the calculated valid time limit with the valid time limit registered in advance to judge whether or not the newly calculated valid time limit is later than the valid time limit registered in advance (step S207).

In a case where the calculated valid time limit is later than the valid time limit registered in advance, the corresponding valid time limit on the communication admissible list is updated (step S208: valid time limit updating processing).

In the meantime, when judged that the selected entry is not registered to the communication admissible list, the selected entry and the calculated valid time limit are registered to the communication admissible list (step S209).

Thereafter, the communication admissible list generating device 224 makes a judgment to check whether or not the valid time limit updating processing is performed on all the transmitter and receiver combination entries (step S210). When the valid time limit updating processing is not completed, the processing from step S205 is executed for the transmitter and receiver combination entry on which the processing has not been executed. When the valid time limit updating processing is completed, the communication admissible list generating and updating processing is ended.

The communication admissible list generating device 224 generates and updates the communication admissible list through regularly executing the communication admissible list generating and updating processing of the steps S203-210. Further, the communication admissible list generating and updating processing may be set to be executed based on an execution request signal transmitted from the communication control server 23. This makes it possible to lighten the load on the communication admissible list management server 22 regarding the communication admissible list updating processing.

As described above, the second exemplary embodiment is designed to include the communication control server 23 which manages the communication history information of a plurality of communication terminal devices and communication parties, and the communication admissible list management server 22 which manages the communication admissible list generated based on the communication history information. Therefore, it is possible to lighten the functional load imposed upon the communication terminal devices.

Further, it is possible to eliminate communications and communication accesses from malicious communication parties such as crank calls and unsolicited mails, and to select the communication party flexibly without applying to a telecommunication company or an Internet access provider.

Further, since it is possible to generate and update the communication admissible list automatically based on the communication history information, the user of the communication terminal device can lighten the troublesome work required for maintaining and keeping the communication admissible list (white list) manually.

Furthermore, through setting the communication admissible period with the communication party having a large amount of talks and communications as well as with other users to be longer, a long period can be allowed to the closely-related communication parties with whom communications are made more frequently. Meanwhile, it comes to automatically reject communications with the communication party who becomes estranged and does not make communications any more.

Further, in order to keep the registered state to the white list, it is necessary to perform a specific amount of talks and communications or more with the party in a specific period.

Thus, a malicious user (communication party) registered on the white list can be eliminated effectively.

Furthermore, it is possible to provide a high-security service by utilizing a combination of white lists of a plurality of users.

Third Exemplary Embodiment

Next, a third exemplary embodiment according to the communication management system of the present invention will be described.

Note here that same reference numerals are applied to the same components as those of the second exemplary embodiment described above.

As shown in FIG. 6, the third exemplary embodiment of the communication management system according to the present invention has almost the same structure as the case of the above-described second exemplary embodiment (FIG. 4) in terms of the device structural components of the system. The third exemplary embodiment is different from the second exemplary embodiment in terms of the structure in respect that a group list searching and acquiring device 321 is mounted to the communication admissible list management server 22 of the second exemplary embodiment, and a data sharing service server 32 is additionally provided to the communication terminal device 20 and the communication admissible list management server 22.

Detailed explanations thereof will be provided hereinafter.

This exemplary embodiment is designed to include: a communication terminal device 20 connected to communication parties and other communication terminal devices via a communication network; and a communication control server 23 which controls communicating actions executed by the communication terminal device 20. The communication terminal device 20 includes: a communication device 201 which executes communications with the communication parties and other communication terminal devices; and a condition information setting device 202 which inputs setting of condition information applied when selecting the communication party that is allowed to have a communication. The communication control server 23 is connected to a single or a plurality of communication terminal devices including the communication terminal device 20, and includes a communication control device 231 which controls the communication actions executed by each of the communication terminal devices and a communication history information memory device 232 which stores the communication history information regarding the communications executed by each of the communication terminal devices.

Further, the third exemplary embodiment is designed to include: a communication admissible list generating device 224 which is connected to the communication history information memory device 232 and generates a list of the communication parties of each of the communication terminal devices based on the communication history information; a condition information memory device 223 which is provided along with the communication admissible list generating device 224 to store the inputted condition information; and a communication admissible list memory device 225 which stores the list generated by the communication admissible list generating device 224. Further, a communication management server 22 having a group list searching and acquiring device 321 for acquiring a list in response to a request from the lists stored in the communication admissible list memory device 225, a shared data space 342 which stores communication data used by the single or plurality of communication terminal devices, and a data sharing service server 34 having an access control device which controls communication accesses for the shared data space 342 are connected to the communication control device 20 and the communication admissible list management server 22.

The communication terminal device 20, the communication control server 23, the communication admissible list management server 22, and the data sharing server 34 may be implemented by a typical server device or a personal computer which includes a CPU, a memory, a hard disk device, and the like, or may be a portable terminal such as a portable telephone or a PDA which includes a CPU, a memory, and the like.

Detailed explanations thereof will be provided hereinafter.

The communication device 201 of the communication terminal device 20 includes a communication interface connected to the communication network, and executes communications with a communication party (another communication terminal device) via the communication network by using a telephone, e-mail, or the like.

In this exemplary embodiment, the communication device 201 is connected to the communication control device 231 of the communication control server 23 to be described later via a communication line, and executes communications with the communication party according to the communication control performed by the communication control device 231.

Further, the communication device 201 has a communication access executing function which makes communications accesses to the shared data space 342 of the data sharing service server 34 to be described later.

As in the case of the second exemplary embodiment described above, the condition information setting device 202 has a condition information setting function which transmits reliability rule setting information to the condition information memory device 223 of the list management server 22.

This makes it possible for the user of the communication terminal device 20 to set the condition for generating the communication admissible list flexibly and easily in accordance with the communication state and the communication party.

The communication admissible list management server 22 may have a function which sets the condition for generating the communication admissible list to the condition information setting device 202.

Next, each device provided to the communication control server 21 will be described in detail.

The communication control device 231 has a communication control function which performs controls of communications and communication session executed by the communication device 201 of the communication terminal device 20 as in the case of the second exemplary embodiment. Thereby, the communication terminal device 20 can make communications with other users (communication parties) by voice, data, or multimedia via the communication network.

Further, through providing this communication control function to the communication control server 23 that is connected to the communication terminal device 20 via the communication line, communications performed with a plurality of communication terminal devices can be controlled simultaneously. Furthermore, the functional load imposed upon each of the communication terminals devices 20 can be lightened.

Further, the communication control device 231 has a receiving communication judging function which judges whether or not to permit a communication and a communication access (generally called "communication") made to the communication device 201 from a communication party by referring to the communication admissible list in the communication admissible list memory device 225.

Furthermore, the communication control device 231 has a history information storing function which stores the communication history information showing the history of communications performed by the communication device 201 to the communication history information memory device 232. The communication history information may contain the information for specifying the communication party, the number of times of communications, a total amount of communications, and the like.

Further, the communication control device 231 has a list searching and judging function which searches the communication admissible list memory device 255 and judges whether or not the communication party that is to have a communication is on the communication admissible list and whether or not the communication admissible time limit (referred to as "valid time limit" hereinafter) is valid, before performing a communication of the communication device 201. When the valid time limit is expired, the communication control device 231 does not establish a communication session with the communication device 201 of the communication party.

Further, the communication control device 231 has a communication history information storing function which acquires the communication history information of the communication device 201 when the communication device performs a communication, and stores the communication history information to the communication history information memory device 232. Furthermore, the communication control device 231 has a history information updating function which updates the communication history information stored in the communication history information memory device 232 based on the communication performed by the communication device 201.

In this exemplary embodiment, described is a case where the communication control device 231 takes the communication device 201 of the communication terminal device 20 as a target of communication control. However, it is to be understood that the communication control device 231 performs the communication control for the communications devices of other different communication terminal devices in the same manner.

Like the communication history information memory device 12 of the first exemplary embodiment, the communication history information memory device 232 is a database having a history information memory function which stores the communication history information of the communication device 201.

Further, as described above, the communication history information contains the information regarding the communication party with which the communication terminal device 20 communicated via the communication device 201, the communication start time, the communication end time, the length of communicated time, the communication data amount, and the like.

In this exemplary embodiment, the communication history information memory device 232 stores and keeps communication history information of a plurality of different communication terminal devices including the communication terminal device 20. The communication control device 231 updates the contents of the communication history information as the communication device 201 performs a communication, so that the communication history information memory device 232 can maintain the state where the latest communication history information of the communication device 201 is stored.

Further, when the communication party user does not respond to transmit and receive a communication, information including the fact indicating that the communication party does not respond to have a communication is recorded. Alternatively, such case may be set to record no history information.

Next, each device provided to the communication admissible list management server 22 will be described in detail.

The condition information memory device 223 and the communication admissible list generating device 224 have the same functions as those of the second exemplary embodiment, respectively.

As in the case of the second exemplary embodiment described above, the communication admissible list memory device 225 has a communication admissible list storing and holding function which stores and holds the communication admissible list generated by the communication admissible list generating device 224, and a list information providing function which provides the entry information of the corresponding communication admissible list in response to a request from the communication device 231.

This makes it possible to properly provide the communication admissible list, which corresponds to a plurality of different communication terminal devices, to the communication control device 231 which controls the communicating actions of each communication terminal device.

The group list searching and acquiring device 321 has a, group member list searching and acquiring function which searches and acquires the communication admissible list stored in the communication admissible list memory device 325 in response to a group member list acquiring request from the access control device 341 of the data sharing service server 34. When acquiring the group member list, the group list searching and acquiring device 321 conducts a search hierarchically by following the communication admissible lists stored in the communication admissible list memory device 325 based on a rule "belong to a same group as the communication party that is on the communication admissible list of the communication parties registered to the communication admissible list", and acquires the group member list.

Processing performed by the group list searching and acquiring device 321 for acquiring the group member list is executed by performing multi-tree search for the communication admissible lists of the registered communication parties by having the communication admissible list of the communication party as a start point in the communication admissible list memory device 225 as in FIG. 8, and acquires the detected communication parties as the group member list.

Further, the group list searching and acquiring device 321 has: a group member list generating function which generates a group member list based on the acquired communication admissible list and the received group member list acquiring request; a group member list holding function which holds the generated group member list; and a group member list informing function which informs the group member list to the access control device 341.

The access control device 341 of the data sharing service server 34 has an access control function which makes a judgment on an access in response to an access request transmitted from the communication device (for example, the communication device 201) of a plurality of different communication terminal devices including the communication terminal device 20 and performs a control regarding whether or not to permit the access.

The access request is a signal for requesting an access to specific data, and it is in this case is a signal for requesting an access to the target data of the shared data space 342 used by a specific communication terminal device or a specific group.

Further, the access control device 341 has a group member list acquiring request transmitting function which transmits, to the group list searching and acquiring device 321, a group member list acquiring request having the communication party of the access request sender as the start point of the search.

The group member list acquiring request may contain a search target and a value limiting the search range, e.g., "from the search start point to the communication party on the three lower hierarchical layers of the multiple-tree structure".

Further, the group member list acquiring request may contain the information which specifies the communication party that is set as the start point of the search.

The shared data space 342 is a database memory device used by a plurality of communication terminal devices (including the communication terminal device 20), and it has a shared data memory function which stores data possessed or shared by a single or plurality of communication terminal devices.

Further, the shared data space 342 may have a shared data providing function which provides the shared data in response to the access to the shared data made via the access control device 341.

(Explanation of Actions of Third Exemplary Embodiment)

Actions of the communication management system according to the third exemplary embodiment will be described.

Note here that the action for storing the communication admissible list to the communication admissible list memory device 225 according to this exemplary embodiment is the same as the case of the second exemplary embodiment (FIG. 5).

Next, actions of the group list searching and acquiring device 321 of the communication admissible list management server 22 according to this exemplary embodiment will be described by referring to flowcharts of FIG. 7A, FIG. 7B and to FIG. 8.

First, the group list searching and acquiring device 321 determines the partner terminal user to be the start point of the group list search (step S301).

It is assumed here that the communication party set as the start point of the search is contained in the group member list acquiring request transmitted from the access control device 341 that is the sender of the request. As described above, the group member list acquiring request may contain a value limiting the search range, e.g., "from the search start point to the communication party on the three lower hierarchical layers of the multiple-tree structure".

Then, the group list searching and acquiring device 321 performs processing for acquiring the group member list shown in FIG. 7B targeted on the communication party that is the start point of the search (step S302). Detailed actions of this processing will be described later.

Thereafter, the group list searching and acquiring device 321 informs the generated group member list to the access control device 341, and ends the processing (step S303).

Next, group member generating processing executed in step S302 of FIG. 7A will be described by referring to the flowchart of FIG. 7B and a tree chart of FIG. 8.

Here, described is the group member list generating processing executed by having the communication party A as the start point. Further, the processing is described by referring to a case where the group member list generating processing is executed under a member list acquiring condition of "from the communication party set as the start point to the two lower hierarchical layers".

First, the group list searching and acquiring device 321 acquires the group member list acquiring request transmitted from the access control device 341, and acquires the communication admissible list of the communication party (A of FIG. 8 in this case) set as the start point from the communication admissible list memory device 225 in response to the group member list acquiring request (step S311).

Then, the group list searching and acquiring device 321 selects one communication party (for example, B of FIG. 8) from the communication parties (B and C in this case) which are on the acquired communication admissible list of A (step S312).

Thereafter, executed is a judgment regarding whether or not the selected communication party (B) is already being registered to the group member list that is held in advance to the group list searching and acquiring device 321 (step S313). When judged that the communication party (B) is already being registered, the processing for generating the group member list is not executed for the selected communication party (to step S317).

When the selected communication party (B) is not registered to the group member list, the valid time limit of the entry of the communication party (B) is checked (step S314). When the valid time limit is expired, the communication party (B) is not registered to the group member list (to step S317).

When the admissible period of the communication party (B) is valid, the group list searching and acquiring device 321 registers the communication party (B) to the group member list (step S315).

Then, the group list searching and acquiring device 321 executes the group member list generating processing shown in the steps S311-S315 recursively starting from the selected communication party (B) by having the group member list as a member adding target. Thereafter, it is judged whether or not the group member list generating processing is executed on each of all the communication parties (for example, A or D) registered on the communication admissible list of the communication party (B in this case) on the lower layer set as the start point (step S317).

When the group member list generating processing starting from the communication party on the lower hierarchical layer is ended, it is judged whether or not the same group member list generating processing is executed on each of all the communication parties (B or C) registered to the communication admissible list of the communication party (A) on the upper hierarchical layer (step S318).

When the processing is not completed, the same processing is executed on the communication party on which the processing has not been executed.

When the all processing having the communication parties B-G on the lower hierarchical layer as the start points is completed, the group member list generating processing having the communication party (A) as the start point is ended.

Next, actions (communication access control actions) of the access control device 341 of the data sharing service server 34 when controlling and judging whether or not to permit a communication access from the communication terminal device 20 to the shared data space 342 will be described by referring to a flowchart of FIG. 9.

First, the communication terminal device 20 transmits an access request to the access control device 341 for making an access to the shared data space 342 (step S321).

Then, the access control device 341 receives the access request, and transmits a group member list acquiring request to the group list searching and acquiring device 321 (step S322).

The access control device 341 acquires the group member list generated responding to the group member list acquiring request from the group list searching and acquiring device 321, and checks whether or not the communication terminal device 20 is contained in the group member list (step S323).

When the communication terminal device 20 is contained in the group member list, the access control device 341 allows the communication terminal device 20 to make an access to the access target data within the shared data space 342 that belongs to a specific user (step S324).

In the meantime, when the communication terminal device 20 is not contained in the group member list, the access control device 341 rejects the communication terminal device 20 to make an access to the access target data of the shared data space 342 (step S325).

As described above, with the third exemplary embodiment, the group which uses the shared data is set based on the communication admissible list (white list) which is generated from the communication history information. Therefore, it is possible to have a highly reliable group and data sharing service server.

Further, it is possible to have a highly reliable group and data sharing service server based on the communication history.

Furthermore, since the user having more talk and communication amount is set to have a longer valid time limit, so that the parties who make contact habitually are registered to the white list without minding it. This makes it possible to keep the group configured with highly reliable members.

Further, reconstruction of the users accessible to the shared data is automatically conducted based on the communication history information, and the user that has become estranged in terms of relation regarding talk and communication history is automatically derived of the access right. Therefore, malicious users can be effectively and easily eliminated from the group and the data sharing service.

Furthermore, even if a malicious user tries to get into a group of a target person or tries to make an access to the shared data space of the data sharing service server, the members of the group cannot be recognized from outside. In addition, unless the malicious user is registered to the white list of the target user, it is possible that the malicious user may become excluded from the same group as that of the target party because of changes in the white list of some user. In order to keep being the member of the group, it is necessary to make a contact continuously with the members of the same group. Therefore, it is possible to achieve a system with which it is hard for the malicious user to continuously participate in the data sharing service.

Fourth Exemplary Embodiment

Next, a fourth exemplary embodiment according to the communication management system of the present invention will be described.

Note here that same reference numerals are applied to the same components as those of the second and third exemplary embodiments described above.

As shown in FIG. 10, the fourth exemplary embodiment of the communication management system of the present invention has almost the same structure as the case of the third exemplary embodiment (FIG. 6) in terms of the system device structural components. The structure of the fourth exemplary embodiment is different from the third exemplary embodiment in respect that it has a community service server 44 instead of the data sharing server service 34 of the third exemplary embodiment.

The constitutions of the communication terminal device 20, the communication admissible list management server 22, and the communication control server 23 are the same as those of the third exemplary embodiment. However, the communication device 201 of the terminal device 20 according to the fourth exemplary embodiment has a community access function which makes communication accesses to the community service server 44.

The community service server 44 includes: a community space 442 which stores information that is shared in a community configured with a single or plurality of communication terminal users; an access control device 441 which controls accesses made by the communication terminal users to the community; and a community generating and managing device 443 which generates the community based on the group member list generated by the group list searching and acquiring device 321, and updates the members of the community.

Details thereof will be described hereinafter.

The access control device 441 has an access control function which makes a judgment on an access in response to an access request transmitted from the communication device (for example, the communication device 201) of a plurality of different communication terminal devices, and performs a control regarding whether or not to permit the access.

The access request is an access request signal for the target data which is stored in the community space 442 and used by a specific communication terminal user or community. Further, the access control device 441 has: an access inquiry function which inquires whether or not the user that is the transmitter of the access request is a member of the community that owns the community space to which the access is requested; and a communication access judgment control function which performs a control to judge whether or not to permit the communication access for the access request based on a response for the inquiry.

The community space 442 is a database memory device which stores data shared by the community that is formed when a single or plurality of communication terminal users register and stores the setting information of each community, and it has a shared data memory function which stores the data.

Further, the community generating and managing device 443 has a group member list acquiring request transmitting function which transmits, to the group list searching and acquiring device 321, a group member list acquiring request having the communication party of the access request sender as the start point. The group member list acquiring request may contain a value limiting the search range, e.g., "from the search start point to the communication party on the three lower hierarchical layers of the multiple-tree structure".

Further, the group member list acquiring request may contain the information which specifies the communication party that is set as the start point of the search.

Furthermore, the community generating and managing device 443 has: a group search requesting function which regularly performs group search of the community service users for the group list searching and acquiring device 321 of the communication admissible list management server 22; and a community information memory function which sets the user information of the users belonging to the same group as the information belonging to the same community, and stores the user information in a related manner.

Moreover, the community generating and managing device 443 has a community setting and generating function which sets the community having the users contained on the list as the members, based on the group member list notified from the group list searching and acquiring function 321.

Further, the community generating and managing device 443 has a community member update setting function which sets update of the members of the set community based on the group member list.

At this time, the community generating and managing device 443 may set the property of the all communication party users (referred to as "users" hereinafter) on the community user list as "unchecked".

Further, the communities and the members belonging to the communities are stored in the community generating and managing device 443 by steps shown in FIG. 12 to be described later, and the information is updated regularly.

(Explanation of Actions of Fourth Exemplary Embodiment)

Actions of the communication management system according to the fourth exemplary embodiment will be described.

Note here that the action for storing the communication admissible list to the communication admissible list memory device 225 according to this exemplary embodiment is the same as the cases of the second exemplary embodiment (FIG. 5) and the third exemplary embodiment.

Further, for the action of the group list searching and acquiring device 321 of this exemplary embodiment to generate the group member list is performed in response to the group search request transmitted regularly from the community generating and managing device 443 of this exemplary embodiment instead of the group member list acquiring request transmitted from the access control device 341 of the third exemplary embodiment. Other actions are the same as the case of the third exemplary embodiment (FIG. 7B).

Next, described by referring to a flowchart of FIG. 11 is an action of the access control device 441 of the community service server 44 of this exemplary embodiment executed to control a judgment regarding whether or not to permit an access of the communication terminal device 20 to the community space 442.

First, the access control device 441 receives an access request from the communication terminal device 20 for the data space within the community space 442 that is used by a specific community (step S401).

The access control device 441 inquires to the community generating and managing device 443 whether or not the user of the communication terminal device 20 is a member of the community that owns the data space (step S402).

Then, the access control device 441 judges whether or not the user of the communication terminal device 20 is the member of the community based on the inquiry result from the communication generating and managing device 443 (step S403).

When the user of the communication terminal device 20 is the member of the community, the access control device 441 permits the user of the communication terminal device 20 to make an access to the community space (step S404).

In the meantime, when the user of the communication terminal device 20 is not the member of the community, the access control device 441 does not permit the user of the communication terminal device 20 to make an access to the community space (step S405).

In the explanation of the actions, the case where the communication terminal device 20 makes an access to the community space 442 has been described. However, the communication terminal device 20 may be a general communication party (other communication terminal device) connected to the community service server via a communication line.

Next, actions of the community generating and managing device 443 of the community server 44 according to this exemplary embodiment will be described by referring to a flowchart of FIG. 12. It is assumed that the community generating and managing device 443 regularly acquires the group member list that is generated by the group list searching and acquiring device 321.

First, the community generating and managing device 443 generates a community user list based on the group member list (step S411). At this time, it is assumed that all the properties of the users on the generated community user list are set as unchecked.

The community generating and managing device 443 selects the unchecked users from the generated community user list (step S412).

Then, the community generating and managing device 443 transmits a group member list acquiring request, which is set to have the selected user as the start point, to the group list searching and acquiring device 321 (step S413).

In response to the group member list acquiring request, the community generating and managing device 443 acquires the group member list notified from the group list searching and acquiring device 321. Then, the community generating and managing device 443 sets the community having the users on the group user list as the members, and stores the community list in which the community and the members are related (step S414).

Thereafter, the community generating and managing device 443 judges whether or not the processing of steps S413-414 is executed on each user contained on the generated community list (step S415).

When the processing of steps S413-414 is completed on all the users on the community list, update of the community is ended.

When there is a user on which the processing of steps S413-414 is uncompleted, the processing of steps 412-414 is executed.

As described above, with this exemplary embodiment, the actions of the steps S411-415 are executed regularly to update the community, and dynamically updates the community members in accordance with the changing community admissible list. Therefore, the reliability of the community can be maintained.

This makes it possible to use the group member list generated by the group list searching and acquiring device 321 for automatically generating the community such as SNS (Social Network Service). Furthermore, this makes it possible to manage and maintain the dynamic and highly reliable community service based on the communication history information.

As described above, with the fourth exemplary embodiment, the community is generated based on the communication admissible list (white list) generated from the communication history information. Thus, it is possible to achieve a community service system which generates and manages the high-security and highly reliable community automatically. Further, even if a malicious user tries to make an access to the community to which the target user belongs, the members of the community cannot be recognized from outside. In addition, in order to keep being the member of the group, it is necessary to make a contact continuously with the other members of the community. Therefore, it is possible to achieve a community server and service to which it is hard for the malicious user to make intrusion.

Further, unless the malicious user is registered to the white list of the target user, the malicious user may become excluded from the community because of changes in the white list of other members. In the meantime, the users having regular contacts with each other are registered to the white list without minding it, so that those users can be maintained being the community members.

Further, the community is generated based on the white list that is generated from the communication history information, so that it is possible to generate the community whose members are highly reliable.

Furthermore, reconstruction of the members is executed automatically based on the communication history amount. Thus, the user that has become estranged in terms of relation in the communication history is automatically expelled from the community, so that it is possible to generate the community and the group to which the malicious user is hard to make intrusion. Moreover, it is possible to maintain and manage the community easily.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

INDUSTRIAL APPLICABILITY

The present invention can be applied to a high-security community service and data sharing service, which are provided via a communication network.

BRIEF DESCRIPTION OF THE DRAWINGS

FIG. 6 is a schematic block diagram which shows an entire exemplary embodiment of the communication management system according to the present invention;

FIG. 8 is an explanatory illustration showing an example of correlation regarding the communication admissible lists of the communication management system disclosed in FIG. 6;

REFERENCE NUMERALS

Figure 1:
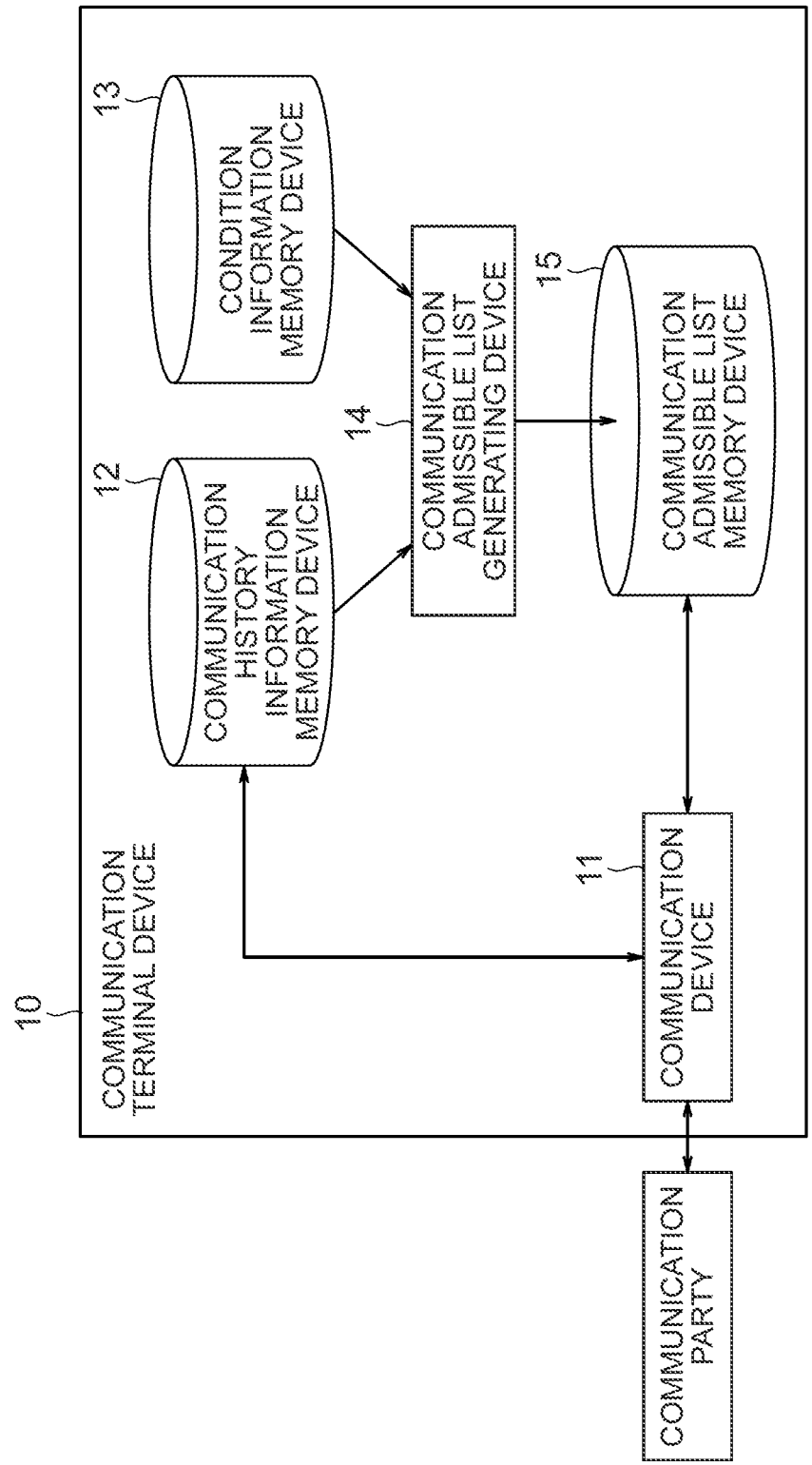
FIG. 1 is a schematic block diagram which shows an entire exemplary embodiment of a communication management system according to the present invention.
Figure 2:
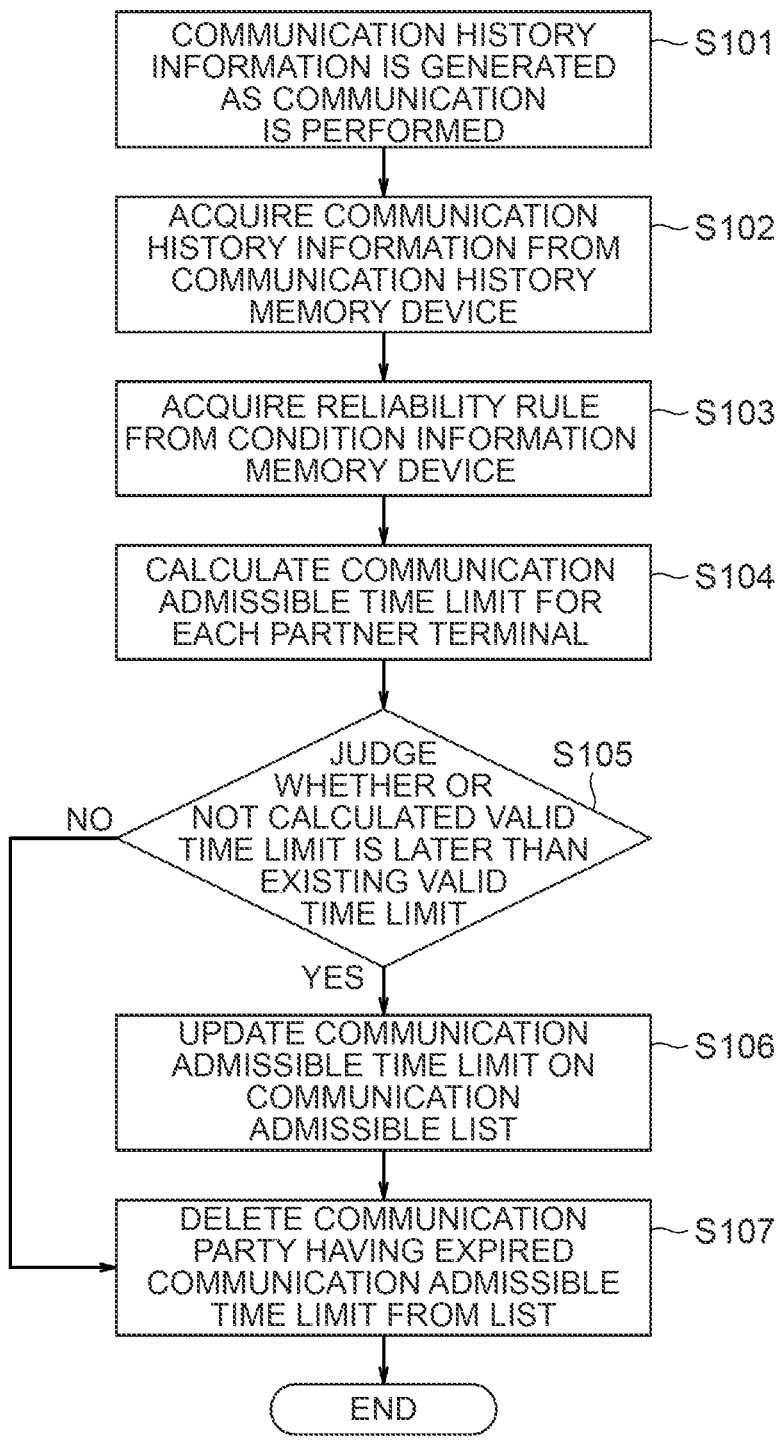
FIG. 2 is a flowchart showing processing steps of communication admissible list registering and updating actions executed in the communication management system disclosed in FIG. 1.
Figure 3:
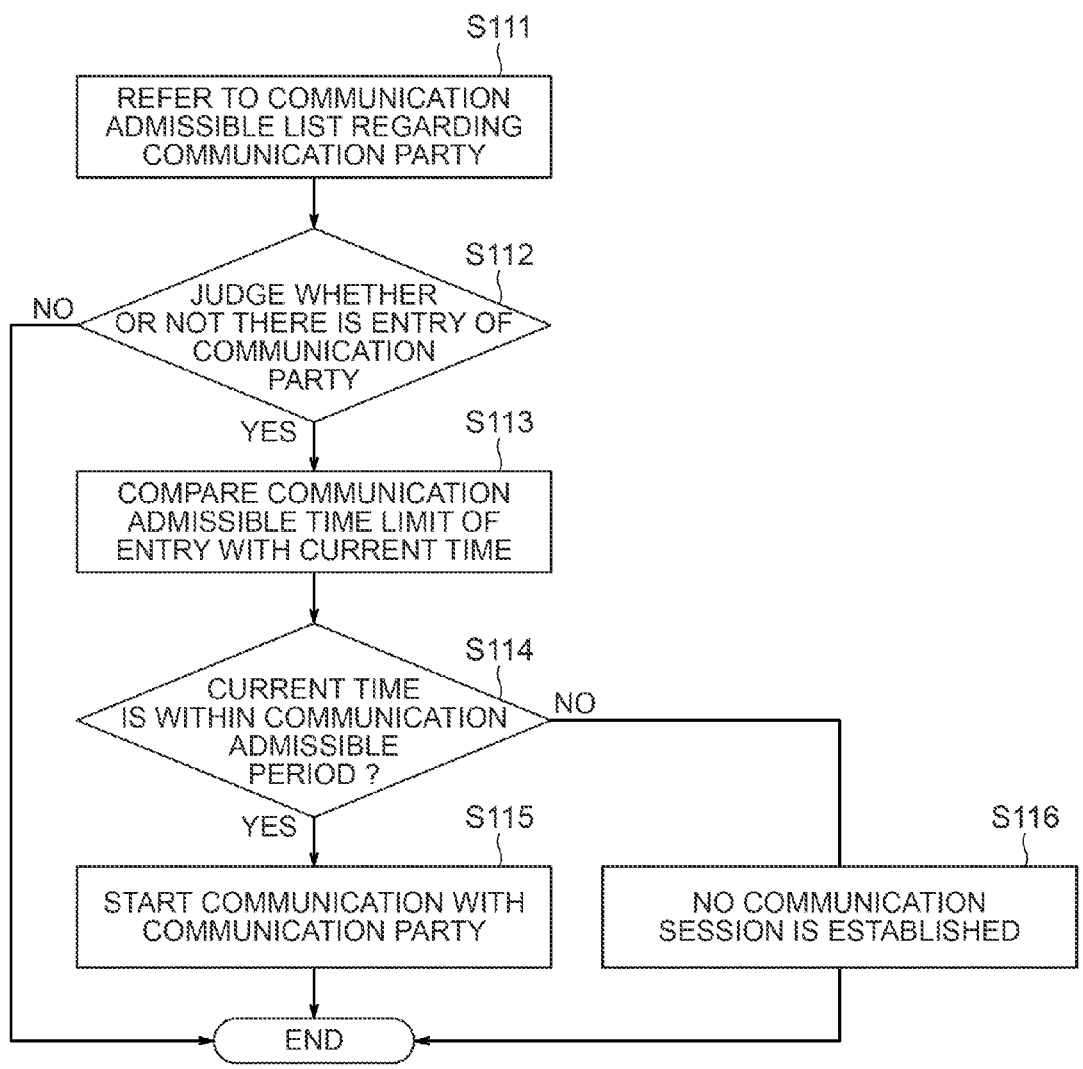
FIG. 3 is a flowchart showing communication permission judgment processing steps executed in the communication management system disclosed in FIG. 1.
Figure 4:
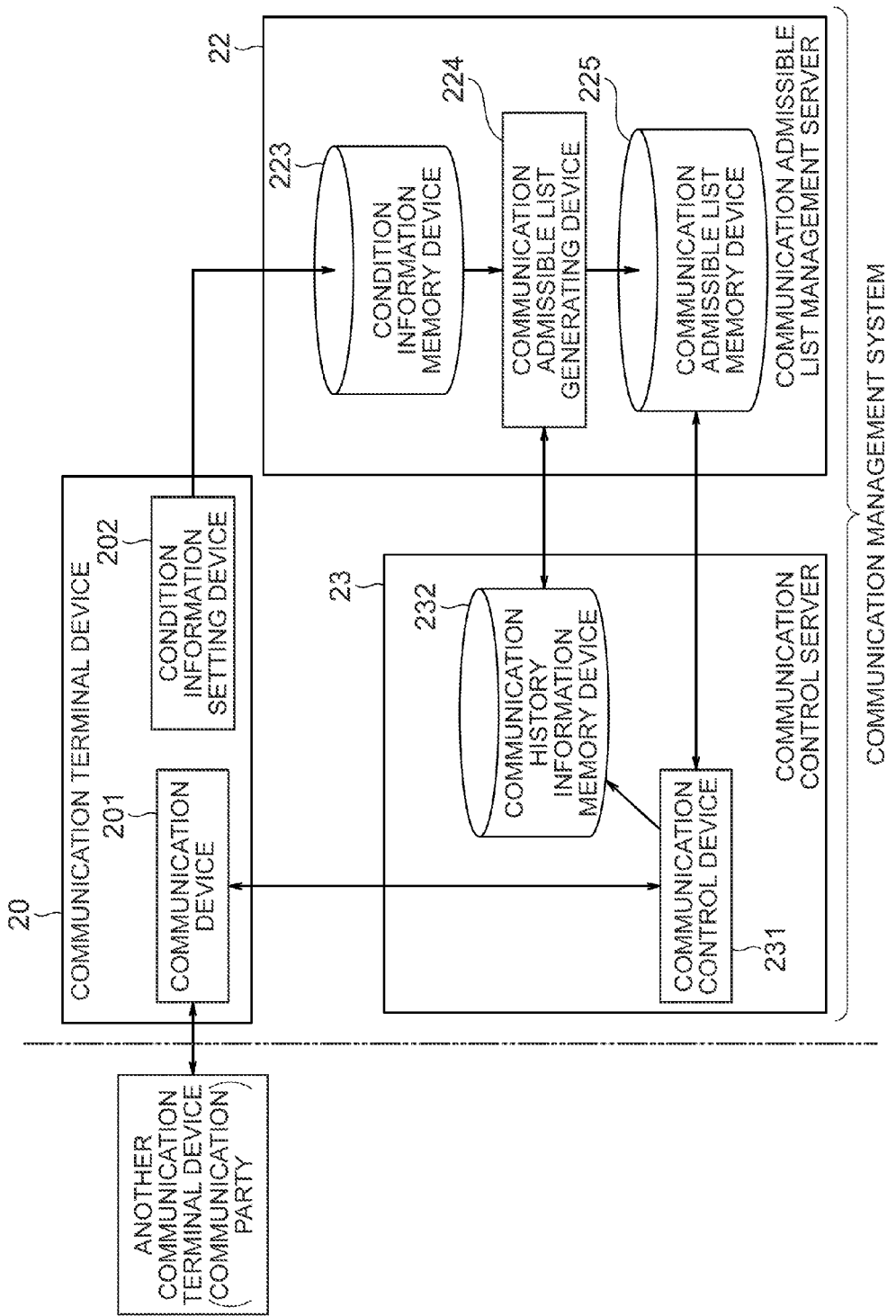
FIG. 4 is a schematic block diagram which shows an entire exemplary embodiment of the communication management system according to the present invention.
Figure 5:
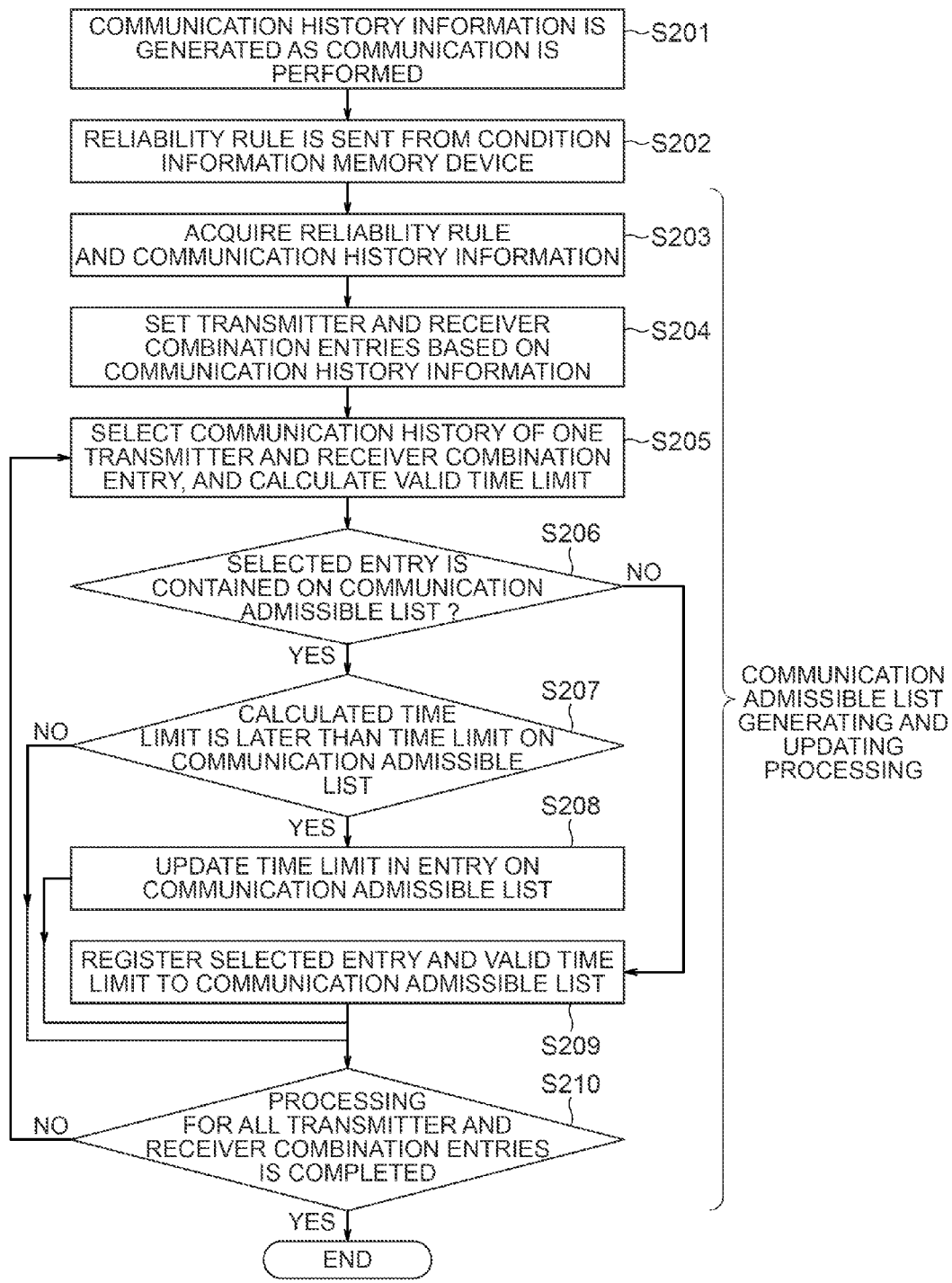
FIG. 5 is a flowchart showing processing steps of communication admissible list registering and updating actions executed in the communication management system disclosed in FIG. 4.
Figure 7A:
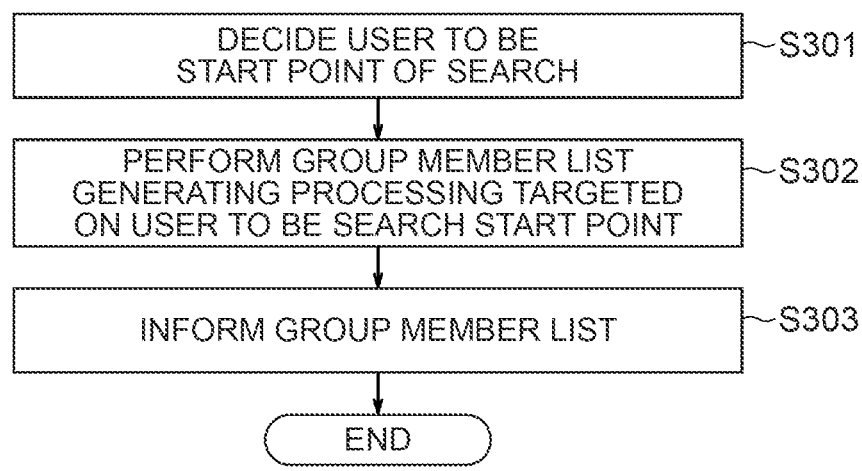
FIG. 7A is a flowchart showing processing steps of group member list acquiring actions executed in the communication management system disclosed in FIG. 6.
Figure 7B:
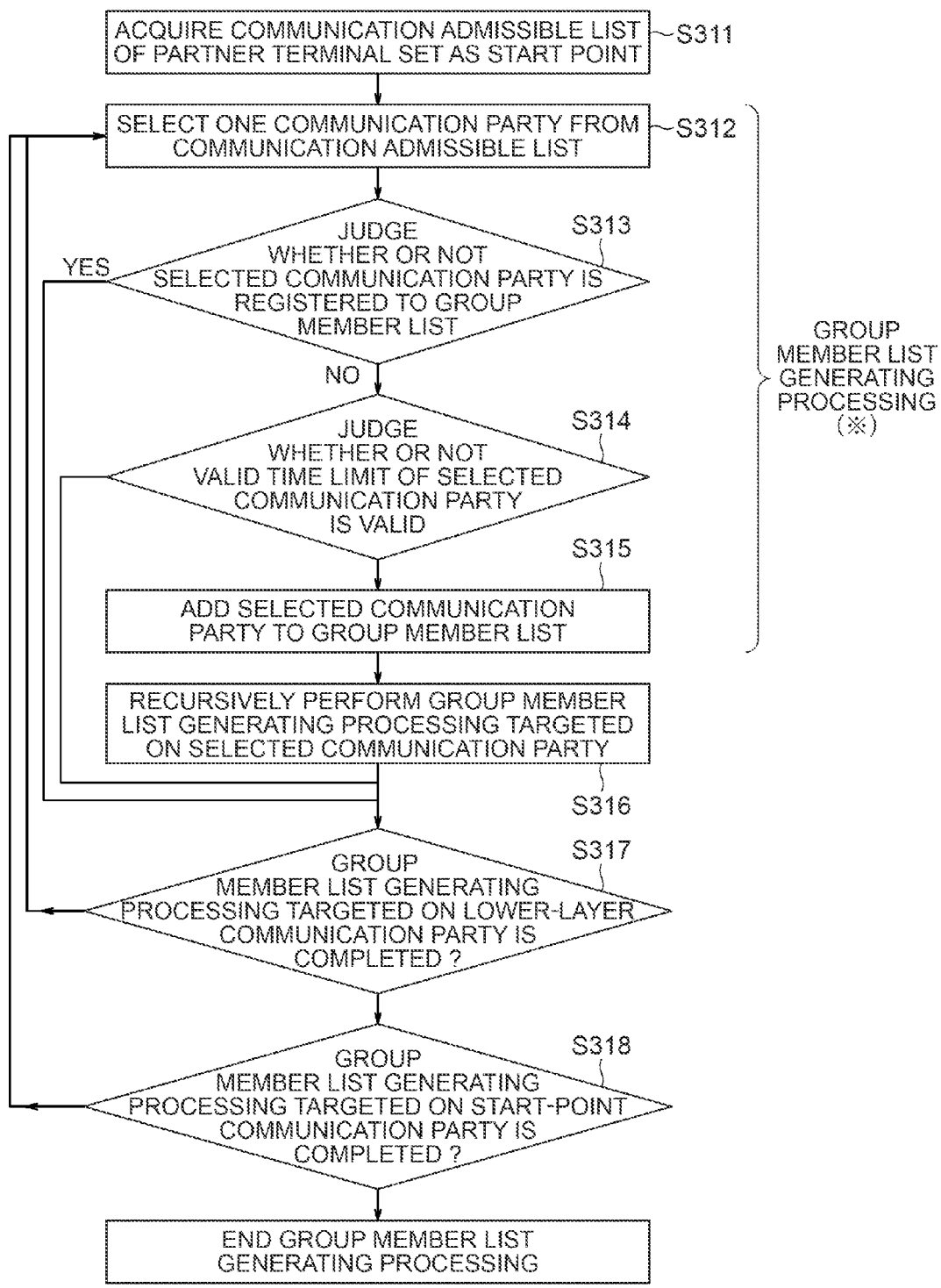
FIG. 7B is a flowchart showing processing steps of group member list generating actions executed in the communication management system disclosed in FIG. 6.
Figure 9:
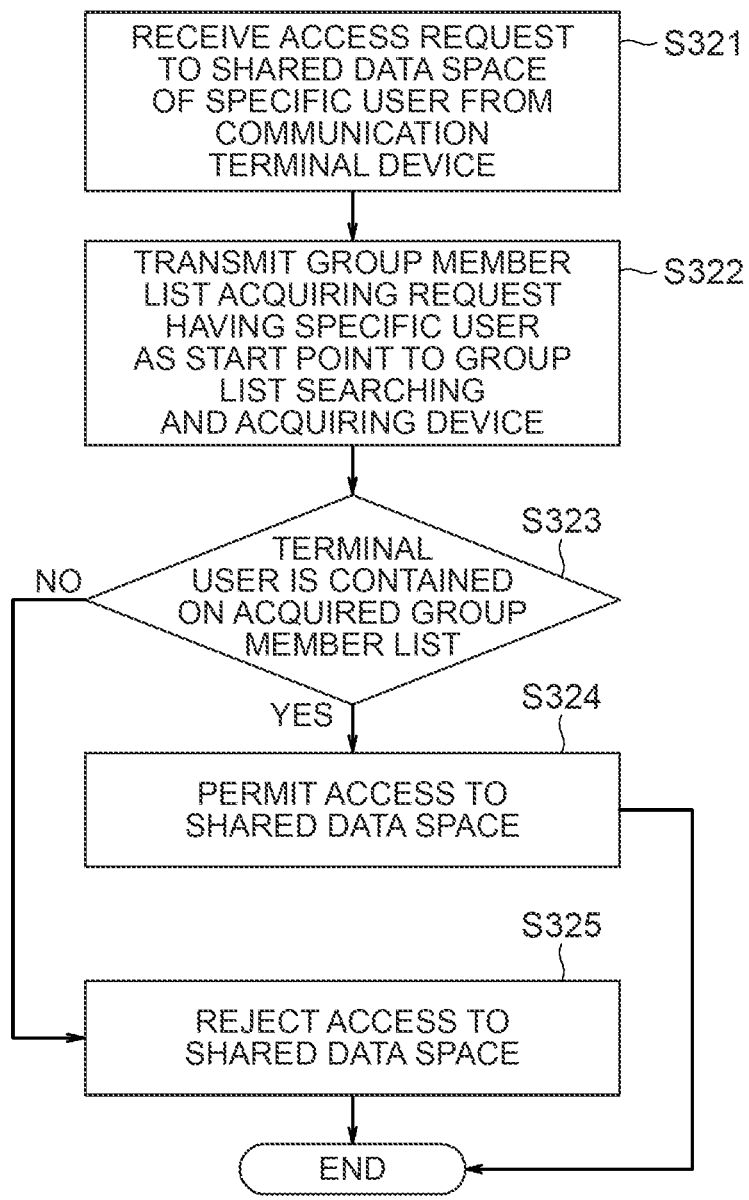
FIG. 9 is a flowchart showing processing steps of communication access control actions executed in the communication management system disclosed in FIG. 6.
Figure 10:
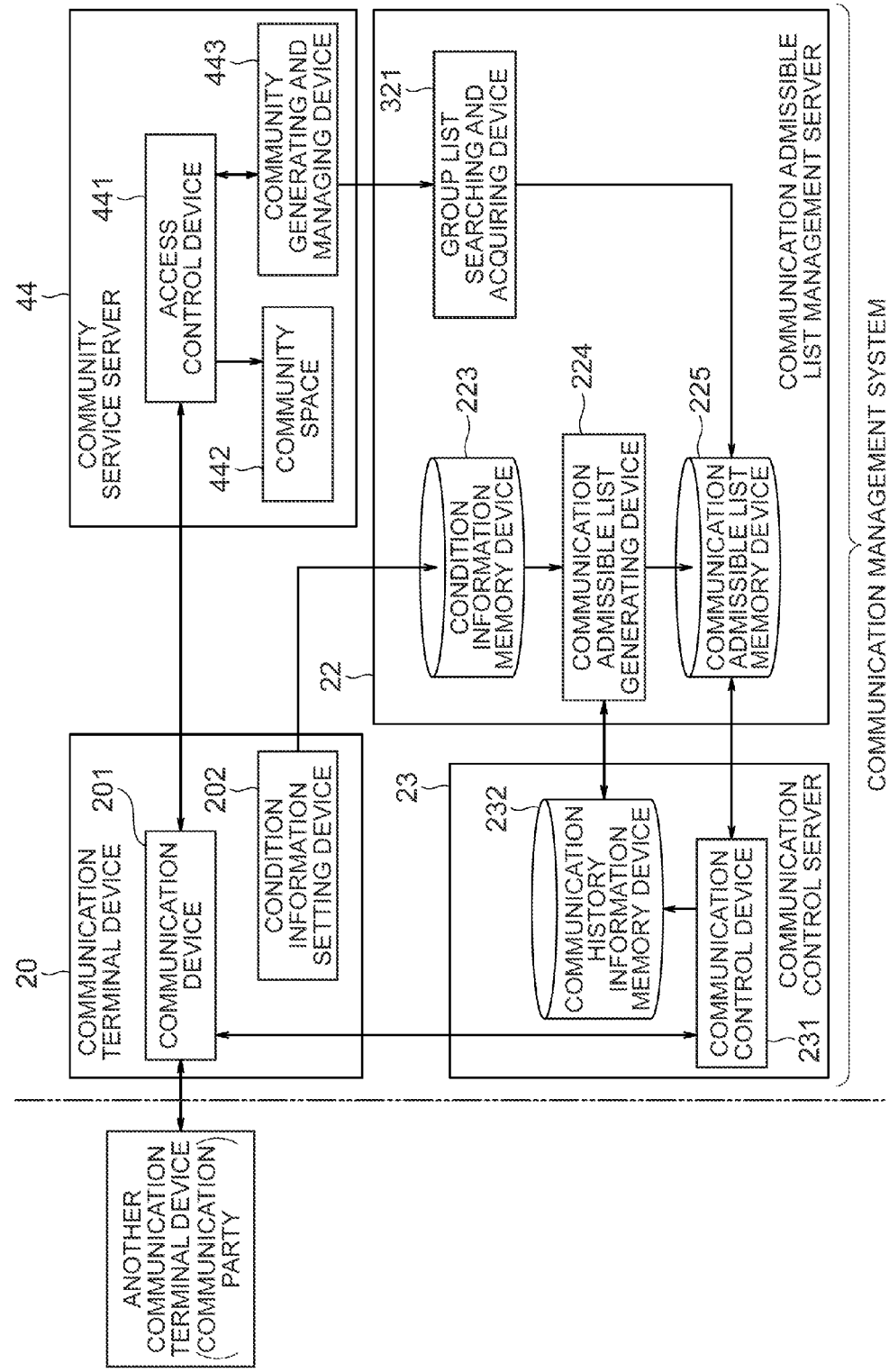
FIG. 10 is a schematic block diagram which shows an entire exemplary embodiment of the communication management system according to the present invention.
Figure 11:
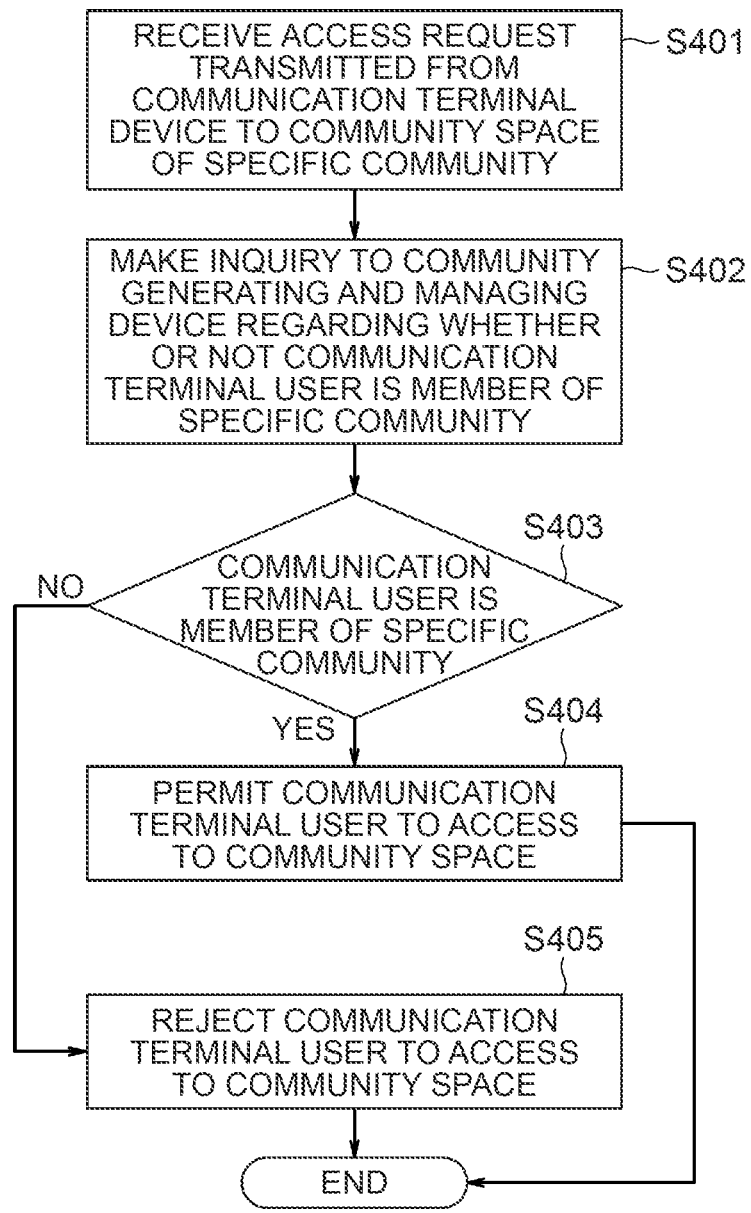
FIG. 11 is a flowchart showing processing steps of communication access control actions executed in the communication management system disclosed in FIG. 10.
Figure 12:
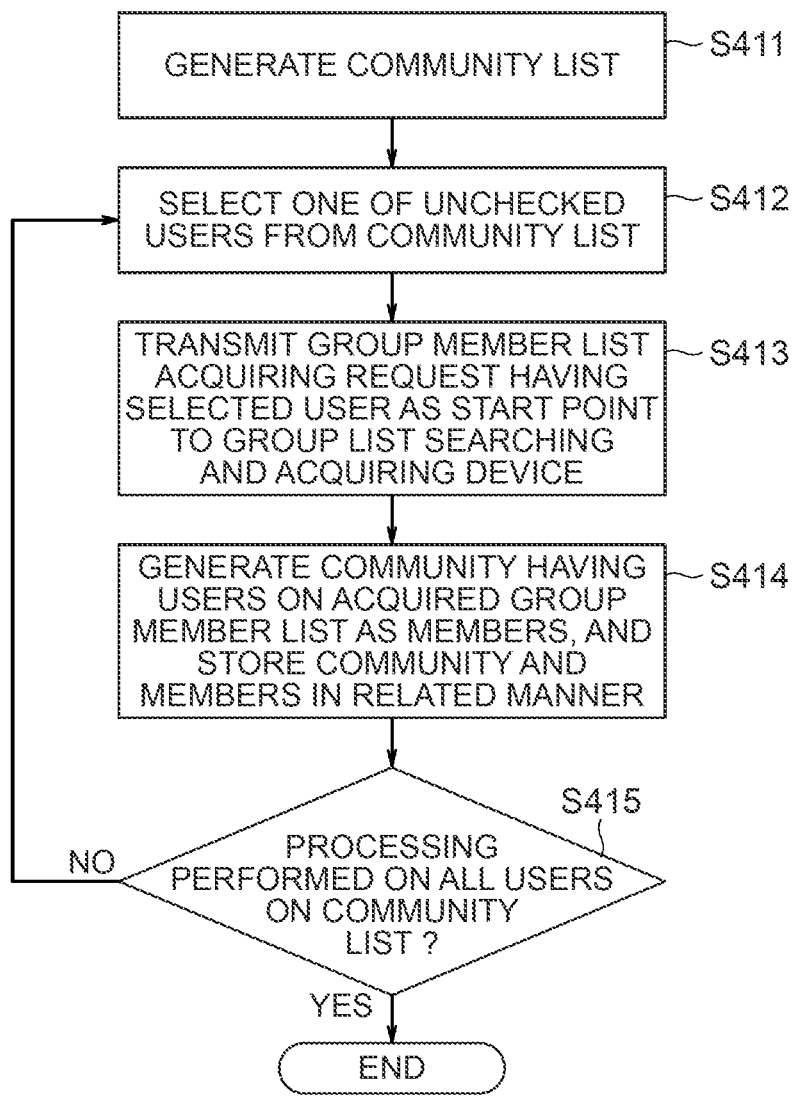
FIG. 12 is a flowchart showing processing steps of actions for generating a community member list.

| | |
|---|---|
| 10, 20 | Communication terminal device |
| 11, 201 | Communication device |
| 12, 232 | Communication history information memory device |
| 13, 223 | Condition information memory device |
| 14, 224 | Communication admissible list generating device |
| 15, 225 | Communication admissible list memory device |
| 22 | Communication admissible list management server |
| 23 | Communication control server |
| 34 | Shared data management server |
| 44 | Community management server |
| 202 | Condition information setting device |
| 231 | Communication control device |
| 341, 441 | Access control device |
| 342 | Shared data space |
| 321 | Group list searching and acquiring device |
| 442 | Community space |
| 443 | Community generating and managing device |

The invention claimed is:

1. A communication terminal device which performs talks and communications via a communication network, the terminal device comprising:
    a communication history information memory device which stores history information of the talks and communications by each talk and communication partner user;
    a condition information memory device which stores a reliability rule that is a basis for judging a reliability relationship of the talks and communications;
    a communication admissible list generating device which judges whether or not the partner user is reliable enough based on the history information of the talks and communications stored in the communication history information memory device by each partner user of the talks and communications and the reliability rule stored in the condition information memory device, and generates a list with a valid time limit;
    a communication admissible list memory device which stores the list generated by the communication admissible list generating device, and provides the list in response to an inquiry that is made when performing the talk and communication with the partner user; and
    a communication device which makes an access to the communication admissible list memory device to search the list of a partner user with which a talk and a communication is to be performed, judges reliability of the partner user based on a search result thereof, and controls the talk and communication.

2. The communication terminal device as claimed in claim 1, comprising
    a condition information setting device which sets the reliability rule to be stored in the condition information memory device.

3. The communication terminal device as claimed in claim 1, wherein
the communication admissible list generating device calculates the valid time limit from the history information, and generates the list including information of the users as targets of the talks and communications along with valid time limit information thereof.

4. The communication terminal device as claimed in claim 1, wherein
the communication admissible list generating device sets length of the valid time limit by comparing the reliability rule stored in the condition information memory device with the history of the talks and communications.

5. The communication terminal device as claimed in claim 3, which uses one of or a combination of two or more items selected from a total number of communications, community frequency, and communication information capacity as the history information.

6. The communication terminal device as claimed in claim 4, which uses one of or a combination of two or more items selected from a total number of communications, community frequency, and communication information capacity as the history information.

7. A non-transitory computer readable recording medium storing a program for a communication terminal device which performs talks and communications via a communication network, the program causing a computer to execute:
a function which manages history information of the talks and communications as a database by each partner user of the talks and communications;
a function which manages a reliability rule as a basis for judging a reliability relationship of the talks and communications as a database;
a function which judges whether or not the partner user is reliable enough based on the history information of the talks and communications stored by each of the partner users of the talks and communications and the reliability rule, and generates a list with a valid time limit;
a function which stores the list, and provides the list in response to an inquiry that is made when performing the talk and communication with the partner user; and
a function which searches the list, and controls the talks and communications by judging reliability of the partner user based on a searched result.

8. The non-transitory computer readable recording medium storing the communication terminal device program as claimed in claim 7, which causes the computer to execute a function which calculates the valid time limit from the history information, and generates the list including information of the users as targets of the talks and communications along with the valid time limit information thereof.

9. The non-transitory computer readable recording medium storing the communication terminal device program as claimed in claim 7, which causes the computer to execute a function which sets length of the valid time limit by comparing the reliability rule with the history of the talks and communications.

10. The non-transitory computer readable recording medium storing the communication terminal device program as claimed in claim 8, which uses one of or a combination of two or more items selected from a total number of communications, community frequency, and communication information capacity as the history information.

11. The non-transitory computer readable recording medium storing the communication terminal device program as claimed in claim 9, which uses one of or a combination of two or more items selected from a total number of communications, community frequency, and communication information capacity as the history information.

12. A management method of a communication terminal device which performs talks and communications via a communication network, the method comprising:
managing history information of the talks and communications by each talk and communication partner user;
managing a reliability rule that is a basis for judging a reliability relationship of the talks and communications;
judging whether or not the partner user is reliable enough based on the history information of the talks and communications stored by each partner user of the talks and communications and the reliability rule, and generating a list with a valid time limit;
storing the list, and providing the list in response to an inquiry that is made when performing the talk and communication with the partner user; and
searching the list, judging reliability of the partner user based on a search result thereof, and controlling the talk and communication.

13. The communication terminal device management method as claimed in claim 12, wherein
the valid time limit is calculated from the history information, and the list is generated including information of the users as targets of the talks and communications along with valid time limit information thereof.

14. The communication terminal device management method as claimed in claim 12, wherein
length of the valid time limit is set by comparing the reliability rule with the history of the talks and communications.

15. The communication terminal device management method as claimed in claim 12, which uses one of or a combination of two or more items selected from a total number of communications, community frequency, and communication information capacity as the history information.

16. Communication terminal means for performing talks and communications via a communication network, the terminal means comprising:
communication history information memory means for storing history information of the talks and communications by each talk and communication partner user;
condition information memory means for storing a reliability rule that is a basis for judging a reliability relationship of the talks and communications;
communication admissible list generating means for judging whether or not the partner user is reliable enough based on the history information of the talks and communications stored in the communication history information memory means by each partner user of the talks and communications and the reliability rule stored in the condition information memory means, and generating a list with a valid time limit;
communication admissible list memory means for storing the list generated by the communication admissible list generating means, and providing the list in response to an inquiry that is made when performing the talk and communication with the partner user; and
communication means for making an access to the communication admissible list memory means to search the list of a partner user with which a talk and a communication is to be performed, judging reliability of the partner user based on a search result thereof, and controlling the talk and communication.

* * * * *